United States Patent
LeMay et al.

(10) Patent No.: US 12,043,321 B2
(45) Date of Patent: Jul. 23, 2024

(54) SYSTEM AND METHOD FOR ADJUSTING THE CHASSIS HEIGHT OF A MACHINE

(71) Applicant: AGCO Corporation, Duluth, GA (US)

(72) Inventors: Adam Joseph LeMay, Jackson, MN (US); Steven Henry Rogotzke, Jackson, MN (US); Cody Evan Franzen, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 18/005,641

(22) PCT Filed: Jul. 14, 2021

(86) PCT No.: PCT/IB2021/056321
§ 371 (c)(1),
(2) Date: Jan. 16, 2023

(87) PCT Pub. No.: WO2022/043780
PCT Pub. Date: Mar. 3, 2022

(65) Prior Publication Data
US 2023/0271654 A1  Aug. 31, 2023

Related U.S. Application Data

(60) Provisional application No. 63/069,833, filed on Aug. 25, 2020.

(51) Int. Cl.
*B62D 49/06* (2006.01)
*A01B 63/02* (2006.01)

(52) U.S. Cl.
CPC ........ *B62D 49/0678* (2013.01); *A01B 63/023* (2013.01); *B62D 49/0607* (2013.01)

(58) Field of Classification Search
CPC ............ B62D 49/0678; B62D 49/0607; B62G 17/00; A01B 63/026
See application file for complete search history.

(56) References Cited

U.S. PATENT DOCUMENTS

| | | | |
|---|---|---|---|
| 4,593,920 A | 6/1986 | Natsume et al. | |
| 6,311,795 B1 | 11/2001 | Skotnikov et al. | |
| (Continued) | | | |

FOREIGN PATENT DOCUMENTS

| | | |
|---|---|---|
| EP | 2058154 A1 | 5/2009 |
| EP | 2248690 A2 | 11/2010 |
| WO | 2010020607 A1 | 2/2010 |

OTHER PUBLICATIONS

UK Intellectual Property Office, Search report for related UK Application No. GB2013724.6, dated Feb. 3, 2021, 4 pages.
(Continued)

*Primary Examiner* — Amy R Weisberg
*Assistant Examiner* — Tiffany L Webb

(57) ABSTRACT

A chassis-height adjustment system for selectively raising and lowering a chassis relative to a ground surface includes a plurality of support assemblies supporting a chassis on respective ground-engaging elements. Each support assembly has a height adjustment actuator. Each height position sensor senses an adjustment position one of the height adjustment actuators and generates a height signal. Each of the support assemblies may be mounted to the chassis by a track-width adjustment mechanism having a track-width adjustment actuator. The height adjustment system is controlled in a manner to synchronize each height adjustment actuator with the other actuators. Adjustment of one or more height adjustment actuators is slowed or stopped in the event that other actuators need to catch up. The track-width adjustment actuators may shift the position of the associated ground-engaging element laterally relative to the chassis to keep the ground-engaging elements from sliding laterally as the chassis height changes.

15 Claims, 16 Drawing Sheets

(56) References Cited

U.S. PATENT DOCUMENTS

| | | |
|---|---|---|
| 6,371,237 B1 | 4/2002 | Schaffer |
| 7,611,153 B2 | 11/2009 | Kim et al. |
| 9,180,747 B2 | 11/2015 | Slawson |
| 9,669,675 B2 * | 6/2017 | Slawson .............. B60G 17/015 |
| 10,071,785 B2 * | 9/2018 | Ginther ................. B62K 25/04 |
| 10,245,914 B2 * | 4/2019 | Kerner ................ A01M 7/0082 |
| 10,556,476 B2 * | 2/2020 | Dames ................... B60G 7/001 |
| 2011/0148053 A1 | 6/2011 | Motebennur et al. |
| 2013/0264801 A1 | 10/2013 | Solbrack et al. |
| 2016/0280034 A1 | 9/2016 | Ogino et al. |
| 2020/0130741 A1 | 4/2020 | Crowley |
| 2020/0163269 A1 | 5/2020 | Crowley |
| 2020/0215865 A1 | 7/2020 | Sirault et al. |

OTHER PUBLICATIONS

European Patent Office, International Search Report related to International Patent Application No. PCT/IB2021/056321, mail date Nov. 10, 2021, 21 pages.

\* cited by examiner

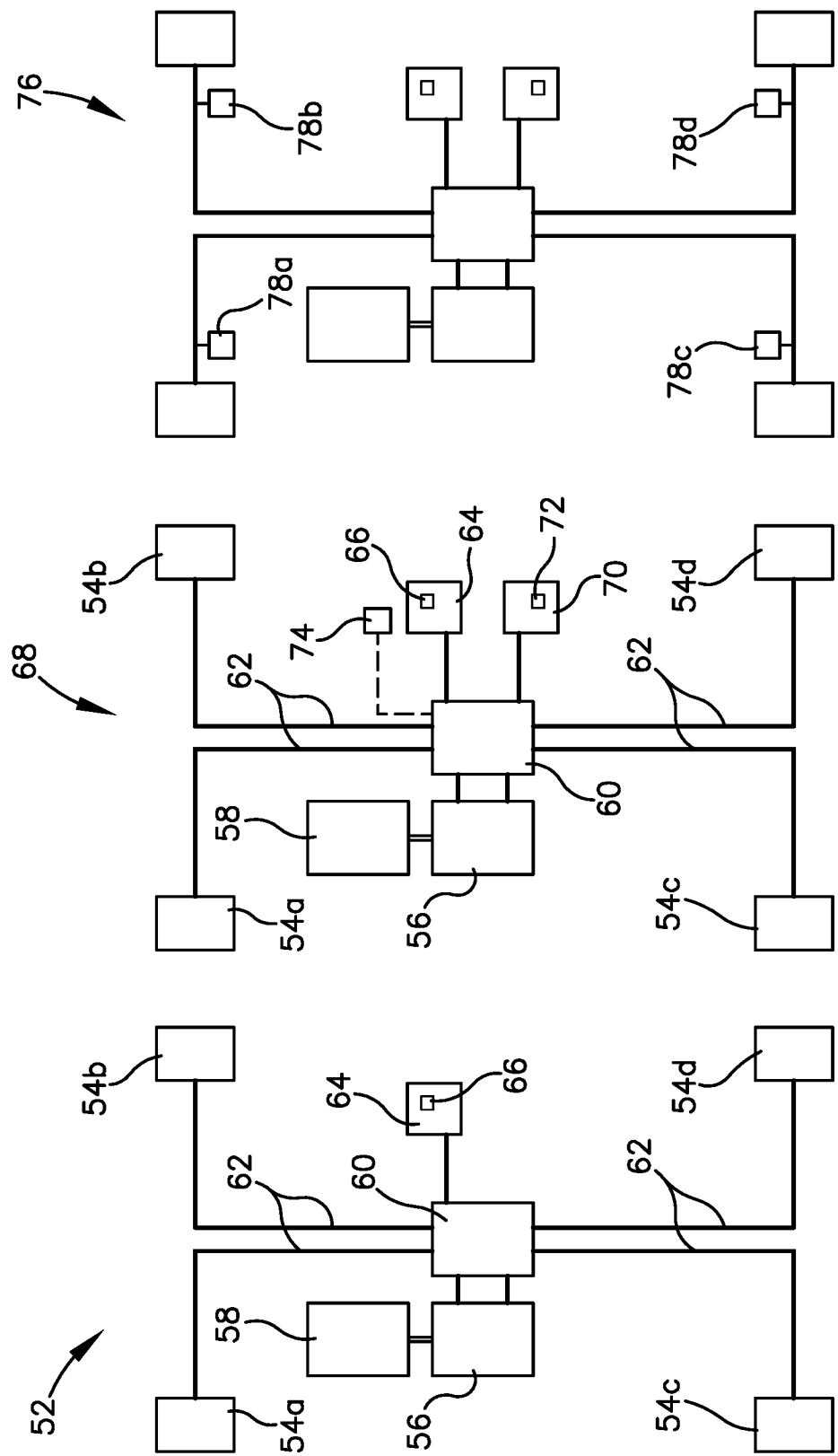

SYSTEM AND METHOD FOR ADJUSTING THE CHASSIS HEIGHT OF A MACHINE

CROSS-REFERENCE TO RELATED APPLICATION

This application is a national phase entry under 35 U.S.C. § 371 of International Patent Application PCT/IB2021/056321, filed Jul. 14, 2021 designating the United States of America and published in English as International Patent Publication WO 2022/043780 A1 on Mar. 3, 2022, which claims the benefit of the filing date of U.S. Provisional Patent Application 63/069,833, "System and Method for Adjusting the Chassis Height of a Machine," filed Aug. 25, 2020, the entire disclosure of which is incorporated herein by reference.

FIELD

Embodiments of the present disclosure relate to mobile machines, such as self-propelled agricultural machines and similar vehicles. More particularly, embodiments relate to mobile machines with adjustable-height chassis.

BACKGROUND

Some agricultural vehicles are configured to be operated in fields among row crops. Application machines such as self-propelled sprayers, for example, may have wheels configured to pass between crop rows and a spray boom that extends outwardly from the vehicle to spray the crop as the machine travels through the field. To avoid damaging the crops as the vehicle moves through the field, each of the wheels must have the proper width to travel between the rows, and the track width—the lateral distance between the wheels—must match row spacing so that the wheels are properly positioned between crop rows. Furthermore, the vehicle should have sufficient ground clearance (the distance between the vehicle body and the surface over which it moves) to clear the crops.

While a standard-height agricultural vehicle may be used to process short crops, such as early stage corn or the like, difficulties arise when processing taller crops, such as mature corn, that are taller than the ground clearance of a standard vehicle. For such crops, high-clearance vehicles may be used. While high-clearance vehicles provide sufficient clearance to pass over the top of taller crops, they suffer from various limitations. For example, high-clearance vehicles, such as those that provide a crop clearance of seventy inches (178 cm) or more, may have an overall height that exceeds highway height restrictions, thereby making the transport of such vehicles to and from the field difficult. For example, public highways often restrict the height of a load to twelve feet (3.66 m) or less, which may be exceeded when a high-clearance vehicle is placed on a transport trailer. Thus, measures may need to be taken to lower the vehicle to an acceptable transport height, such as deflating the tires or entirely removing the wheels.

In addition, while high-clearance vehicles may be desirable for use on tall crops, they are not as effective in processing shorter crops without added complexity in the boom lifting mechanism to accommodate the range of motion required to place the boom at the proper height above the crop when spraying at the various crop heights.

U.S. Pat. No. 9,180,747, "System and Method of Adjusting the Chassis Height of a Machine," granted Nov. 10, 2015, discloses a self-propelled sprayer having a chassis-height adjustment system wherein each of four wheel support assemblies are configured to selectively raise and lower the chassis relative to the ground surface by actuators. Furthermore, the sprayer includes a track-width adjustment system including telescopic axles and actuators for moving inner axles between extended and retracted positions. Control of the chassis adjustment system and track-width adjustment system may be integrated to preserve the track width during adjustment of the height. However, variations in operating characteristics of the various actuators and control valves can lead to uneven or interrupted adjustment of the height and/or track width, in turn making for an uncomfortable operator experience.

The above section provides background information related to the present disclosure which is not necessarily prior art.

BRIEF SUMMARY

A method is disclosed for controlling a chassis-height adjustment system to selectively raise and lower a chassis relative to a ground surface. The system comprises a chassis, a plurality of ground-engaging elements supporting the chassis above a ground surface, and a plurality of support assemblies supporting the chassis on the ground-engaging elements. The support assemblies each comprise a height adjustment actuator. A plurality of height position sensors are each disposed to sense an adjustment position of a respective one of the height adjustment actuators and to generate a height signal that is representative of that adjustment position. The method includes receiving a chassis-height adjustment command and monitoring the height signal for each of the plurality of height adjustment actuators. A first height signal corresponding to a first height adjustment actuator is compared to height signals corresponding to the other height adjustment actuators, and the first height adjustment actuator is only adjusted if the first height signal is within a height tolerance range with respect to the height signals that correspond to the other height adjustment actuators. Advantageously, by stopping movement of one or more of the height adjustment actuators when their position falls outside of a tolerance range with respect to the other height adjustment actuators, the uniformity of chassis-height adjustments may be improved.

Another embodiment includes a chassis-height adjustment system for selectively raising and lowering a chassis relative to a ground surface. The system comprises a chassis, a plurality of ground-engaging elements supporting the chassis above a ground surface, and a plurality of support assemblies supporting the chassis on the ground-engaging elements and comprising a height adjustment actuator. A plurality of height position sensors are each disposed to sense an adjustment position of a respective one of the height adjustment actuators and to generate a height signal that is representative of that adjustment position. A controller is configured to receive a chassis-height adjustment command and to monitor the height signal for each of the plurality of height adjustment actuators. A first height signal corresponding to a first height adjustment actuator is compared to height signals corresponding to the other height adjustment actuators. The first height adjustment actuator is automatically adjusted only if the first height signal is within a height tolerance range with respect to the height signals that correspond to the other height adjustment actuators.

In another embodiment, a method is used to control a chassis-height adjustment system for selectively raising and lowering a chassis relative to a ground surface. The system comprises a chassis, a plurality of ground-engaging elements supporting the chassis above a ground surface, and a plurality of support assemblies supporting the chassis on the ground-engaging elements. Each support assembly comprises a height-adjustment actuator. Each of the support assemblies are mounted to the chassis by a respective track-width adjustment mechanism having a track-width adjustment actuator configured to shift the position of the associated ground-engaging element laterally relative to the chassis. A plurality of height position sensors are each disposed to sense an adjustment position of a respective one of the height adjustment actuators and generate a height signal representative of that adjustment position. A plurality of track-width position sensors are each disposed to sense an adjustment position of a respective one of the track-width adjustment actuators and generate a track-width signal representative of that adjustment position. The method comprises receiving a chassis-height adjustment command and monitoring the height signal for each of the plurality of height adjustment actuators and the track-width signals for each of the track-width adjustment actuators. The first height adjustment actuator is adjusted only if the first height signal is within a track-width tolerance range with respect to the track-width signals.

In some embodiments, a vehicle comprises a chassis, a plurality of ground-engaging elements supporting the chassis above a ground surface, and a motor for driving at least one of the ground-engaging elements to propel the machine along the ground surface. A chassis-height adjustment system is configured for selectively raising and lowering the chassis relative to the ground surface and comprises a plurality of height adjustment actuators, each corresponding to one of the ground-engaging elements. A track-width adjustment system is configured for shifting the position of at least one of the ground-engaging elements laterally relative to the chassis and comprises a plurality of track-width adjustment actuators, each corresponding to one of the ground-engaging elements. A controller is configured to automatically actuate the track-width adjustment system when the chassis-height adjustment system is actuated to preserve a constant track width as the chassis moves up or down relative to the ground surface, and to stop movement of one or more of the height adjustment actuators in response to a sensed position of the height adjustment actuators being outside of a height tolerance with respect to sensed positions of the other height adjustment actuators or being outside of a track-width tolerance with respect to sensed positions of the track-width adjustment actuators.

The independent suspension assemblies of a mobile machine with an adjustable height chassis may be controlled so that the assemblies extend and retract in a synchronized manner when the chassis is raised and lowered. In some embodiments in which a track width is adjusted simultaneously with the chassis height, the track width and height adjustments are controlled so as to be synchronized. If the machine is on level ground, the suspension assemblies may be controlled such that the machine remains level while the chassis is raised and lowered.

In some embodiments, sensors provide data to a control system indicating the extent to which each of the suspension assemblies is extended or retracted and also, in some embodiments, the lateral position of each wheel. In some embodiments, the control system uses that data when raising and lowering the chassis to determine whether to adjust operation of one or more components to improve synchronization.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present disclosure will be apparent from the following detailed description and the accompanying drawing figures.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

FIGS. 3a-3c are block diagrams of various exemplary embodiments of a control system of the applicator of FIG. 1;

DETAILED DESCRIPTION

Figure 1:
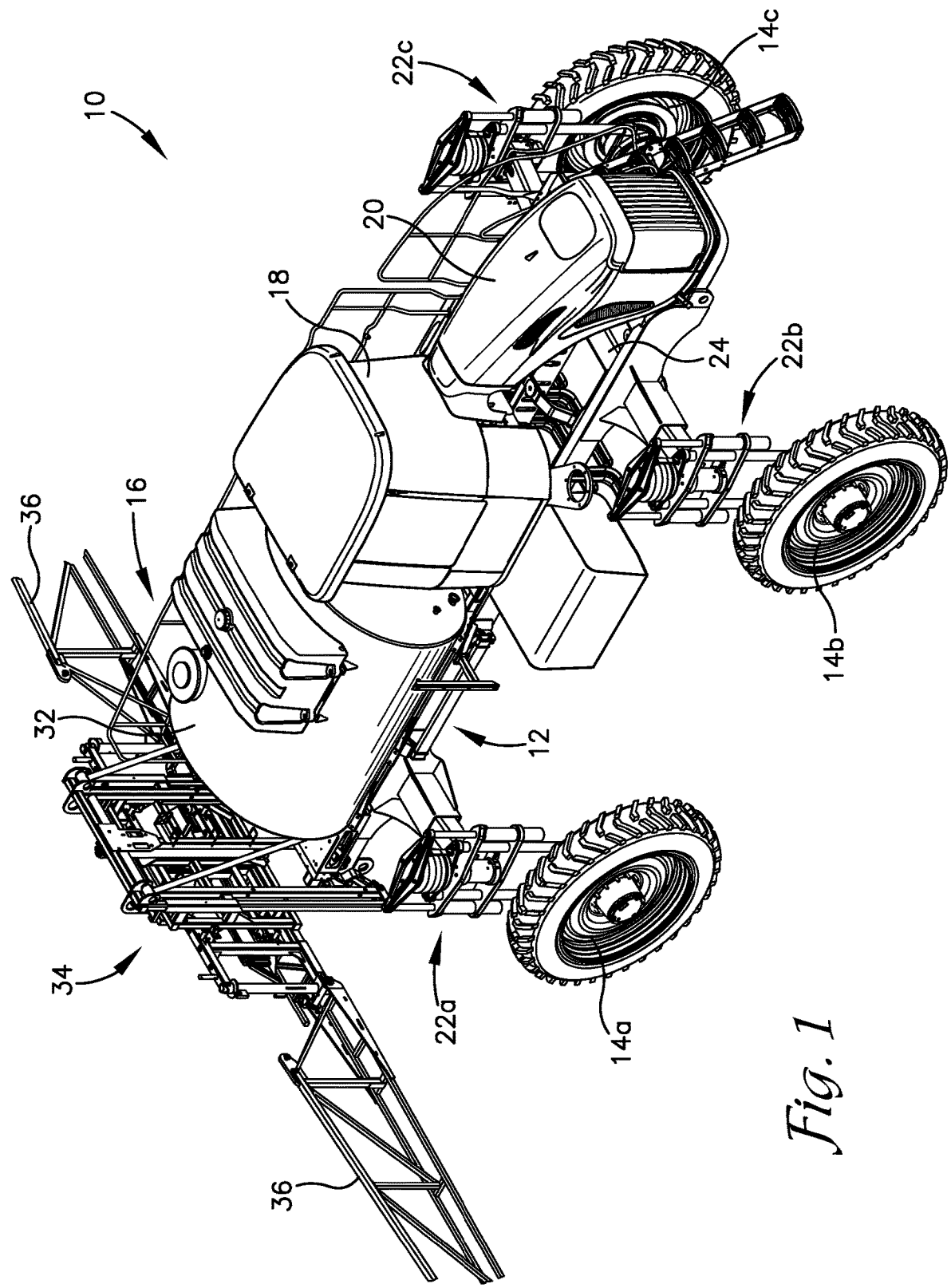
FIG. 1 is a perspective view of an agricultural applicator constructed in accordance with principles disclosed herein.
Figure 2:
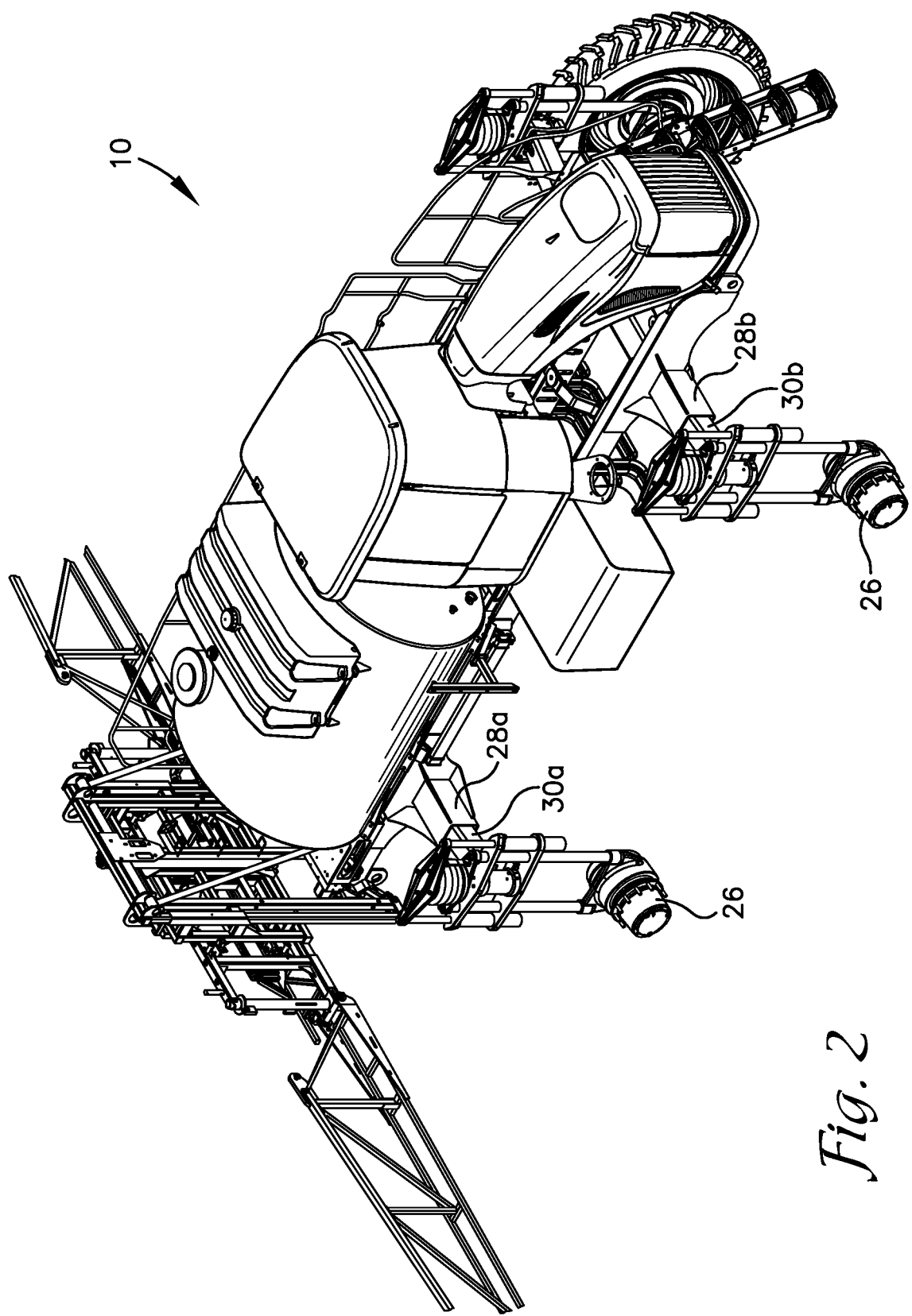
FIG. 2 is a perspective view of the agricultural applicator of FIG. 1 with two of the wheels omitted to more fully illustrate support assemblies interposed between the wheels and the chassis.

The illustrations presented herein are not actual views of any crop sprayer or portion thereof, but are merely idealized representations to describe example embodiments of the present disclosure. Additionally, elements common between figures may retain the same numerical designation.

The following description provides specific details of embodiments. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. The drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, et cetera, described in one embodiment may also be included in other embodiments, but is not necessarily included. Thus, the present technology can include a variety of combinations and/or integrations of the embodiments described herein.

Turning now to the drawing figures, and initially FIGS. 1 through 4, an exemplary applicator 10 includes a chassis 12, a plurality of wheels 14 or other ground-engaging elements supporting the chassis 12 above a ground surface, an application system 16, an operator cabin 18, and an engine compartment 20. A plurality of support assemblies 22 interposed between the wheels 14 and the chassis 12 support the chassis 12 on the wheels 14 and provide suspension, height adjustment, and/or steering functions, as discussed in greater detail below.

Certain components of the applicator 10 have been omitted from the figures for simplicity of illustration and to show certain features of the applicator 10 that would otherwise be concealed. The engine, for example, has been omitted to illustrate components of the applicator frame, including portions of the front axle 24. Certain hydraulic lines, such as hydraulic lines running to and from the assemblies 22, are also omitted. The applicator 10 is illustrated and discussed herein as an exemplary machine with which the support assemblies 22 may be used. It will be appreciated by those skilled in the art that the support assemblies 22 may be used with other machines including other types of applicators or other vehicles or mobile machines that would benefit from the advantages of the various embodiments of the support assemblies disclosed herein, such as chassis height adjustment and independent suspension.

The applicator 10 includes a pair of front wheels 14b, 14c and a pair of rear wheels 14a, 14d (rear wheel 14d hidden from view) of the appropriate size and shape to allow the applicator 10 to travel among row crops with minimal crop disturbance. A used herein, a "wheel" includes an inner, rigid wheel and an outer, flexible tire mounted on the wheel unless otherwise specified. Each wheel 14 may exhibit, for example, an outer diameter of between 60 inches (152 cm) and 85 inches (216 cm) and a width of between 10 inches (25.4 cm) and 25 inches (63.5 cm). More specifically, wheels 14 designed for use with row crops may exhibit an outer diameter of about 70 inches (178 cm) or about 80 inches (203 cm) and a width of about 15 inches (38.1 cm). Alternatively, the wheels 14 may exhibit a width of up to 25 inches (63.5 cm) (or more) for pre-emergent applications, for use on soft terrain, or both to maximize flotation and minimize soil compaction. Each of the wheels 14 may weigh between 600 pounds (272 kg) and 1,000 pounds (454 kg) and may specifically weigh about 700 pounds (318 kg) or about 800 pounds (363 kg). In one exemplary embodiment, each of the wheels 14 is about 70 inches (178 cm) tall, about 15 inches (38.1 cm) wide, and weighs about 700 pounds (318 kg).

The particular size, shape, and configuration of the wheels 14 may vary substantially from one embodiment to another. In some embodiments, the vehicle may include ground-engaging elements other than wheels, such as tracks. Hereinafter, reference will be made to a "wheel" or "wheels" with the understanding that the illustrated wheels 14 may be replaced with other types of ground-engaging elements.

One or more drive motors 26 may be associated with one or more of the wheels 14 for driving rotation of the wheel or wheels relative to the chassis 12 to propel the applicator 10 in forward and reverse directions. In the illustrated embodiment, a separate hydraulic motor 26 is drivingly connected to each wheel 14 such that each of the wheels 14 may be driven independently to propel the applicator 10. Either two or all four of the wheels 14 may be steerable. In some embodiments, the steering functionality of some of the wheels 14 may be selectively enabled and disabled. By way of example, the front wheels 14b, 14c may always be steerable while supplemental steering provided by the rear wheels 14a, 14d may be selectively enabled and disabled. An operator may control the drive motors 26 and steering functions of the wheels 14, including enabling and disabling the steering ability of certain of the wheels 14, from one or more of the user interface elements of the cabin illustrated in FIG. 4.

The applicator 10 includes mechanisms for adjusting the track width of the wheels 14 to accommodate, for example, different spacing needs for row crops. In the illustrated embodiment, the applicator 10 includes telescoping axles with an outer axle 28 and an inner axle 30 associated with each wheel 14, wherein the inner axle 30 slidingly engages the outer axle 28 and allows the wheel 14 to shift laterally relative to the chassis 12. A hydraulic piston or similar actuator may drive the inner axle 30 inward and outward to shift the position of the wheel 14. The inner 30 and outer 28 axles form part of the chassis 12 and, in the illustrated embodiment, the outer axles 28 are rigidly connected to another portion of the chassis, such as one or more frame elements. U.S. Patent Application Publication 2020/0130741, "Mounting Assembly for a Steerable Wheel with Variable Track Width," published Apr. 30, 2020, discloses an example of a telescopic axle with an actuator disposed inside the outer axle and arranged to drive the inner axle inward and outward to shift the lateral position of the associated support assembly and wheel.

The application system 16 is supported on the chassis 12 and may be conventional in nature. In the illustrated embodiment, the application system 16 includes a liquid holding tank 32 and a delivery system 34 for applying a liquid from the holding tank 32 to a crop or field. The holding tank 32 may have a capacity of between 200 gallons (757 l) and 2,000 gallons (7,570 l) and, more specifically, may have a capacity of 700 gallons (2,650 l), 900 gallons (3,410 l), 1,100 gallons (4,160 l), or 1,300 gallons (4,920 l). The delivery system 34 includes a pair of booms 36 supporting hoses, pumps, and spray nozzles or similar components for dispersing or otherwise applying the contents of the tank 32 to a crop. Alternatively, the application system 16 may be configured to apply dry material to a field and therefore may include a hopper and a mechanism for dispersing particulate material from the hopper, such as a pneumatic spreader or one or more spinners.

The operator cabin 18 or "cab" is supported on the chassis 12 and positioned forward of the application system 16. The cabin 18 presents a control environment 38 (FIG. 4) including a steering wheel 40, one or more pedals 42, a drive lever 44, one or more electronic instrument panels 46, and a control panel 48 including buttons, switches, levers, gauges, and/or other user interface elements. The various components of the control environment 38 enable the operator to control the functions of the applicator 10, including driving and operating the application system 16. The various user interface elements are positioned around and proximate a seat 50 for easy access by an operator during operation of the applicator 10. The control environment 38 may include a touchscreen display. One or both of the electronic instrument panels 46, for example, may be or include a touchscreen, or a display terminal with a touchscreen may be mounted on or near the control panel 48.

As mentioned above, the applicator 10 includes a support assembly 22 interposed between each of the wheels 14 and the chassis 12. Each support assembly 22 connects to a hub of one of the wheels 14 and to one of the inner axles 30 such that the wheel 14 and the support assembly 22 shift laterally as a single unit relative to the chassis 12 when the inner axle 30 is shifted relative to the outer axle 28 to adjust the applicator's track width. In some embodiments, the support assemblies 22 include height adjustment components for raising and lowering the chassis 12 of the vehicle between various operating positions. One or more of the support assemblies 22 (or portions thereof) may be selectively pivotable relative to the chassis 12 to steer the applicator 10.

Each of the support assemblies 22 includes one or more actuators for adjusting a height of the chassis, for steering the associated wheel, or both. In some embodiments, the actuators are hydraulic actuators such as linear or rotary hydraulic actuators. FIG. 3a illustrates an exemplary hydraulic control system 52 for operating hydraulic actuator sections 54 in which a centralized hydraulic pump 56, driven by an internal combustion engine 58 or other power source, communicates pressurized hydraulic fluid to a hydraulic controller 60 that regulates fluid flow between the pump 56 and the hydraulic actuator sections 54 associated with the support assemblies via a plurality of hydraulic transfer lines 62. The hydraulic controller 60 may include, for example, a hydraulic manifold or similar device.

Each of the hydraulic transfer lines 62 communicates hydraulic power between the hydraulic controller 60 and one or more hydraulic actuator sections 54 and, thus, may include one or more hydraulic pressure lines and one or more hydraulic return lines. Each of the hydraulic transfer lines may communicate hydraulic power to more than one actuator, and each of the actuator sections 54 may include a group of actuators associated with each wheel 14 and/or assembly 22. By way of example, a first actuator associated with the actuator section 54 may drive steering of the wheel, a second actuator may drive rotation of the wheel, and a third actuator may adjust a height of the chassis 12. It will be appreciated that the actuator sections 54 are exemplary in nature and that the various hydraulic actuators may not be grouped as described herein.

The system 52 includes a control interface 64 in communication with the hydraulic controller 60. The control interface 64 may be part of a user interface that includes one or more physical or virtual user interface elements 66, such as buttons, switches or dials, and may be part of the control environment 38 illustrated in FIG. 4.

It will be appreciated that various different types of technology may be used to actuate the support assemblies 22. Thus, while the various actuators are illustrated and described herein as hydraulic actuators, it will be understood that other types of actuators may be used in place of, or in connection with, the hydraulic actuators. By way of example, electro-mechanical actuators may be used in place of at least some of the hydraulic actuators illustrated and discussed herein.

FIG. 3b illustrates another exemplary control system 68 similar to the system 52 but that includes a computerized controller 70 with a control module 72 for controlling the hydraulic controller 60. The system 68 may also include a wireless interface element 74 in wireless communication with the controller 60 for allowing a user to remotely control the actuator sections 54. The wireless interface element 74 may be a dedicated device, such as a device similar to a key fob commonly used with cars and other vehicles, or a computing device such as smart phone, tablet computer, or wearable computing device programmed or configured for use with the system 68. The wireless interface element 74 may be configured to communicate with the hydraulic controller 60 and/or the computerized controller 70 via short-range wireless communications, such as Wi-Fi or Bluetooth, or via a communications network such as a cellular network.

The controller 70 may include one or more integrated circuits programmed or configured to control the hydraulic controller 60 to actuate the support assemblies 22. By way of example, the controller 70 may include one or more general purpose microprocessors or microcontrollers, programmable logic devices, or application specific integrated circuits. The controller 70 may also include one or more discrete and/or analog circuit components operating in conjunction with the one or more integrated circuits, and may include or have access to one or more memory or storage elements operable to store executable instructions, data, or both. The control module 72 may be a hardware or software module specifically dedicated to enabling the controller 70 to control the hydraulic controller 60 as described herein.

Another control system 76 illustrated in FIG. 3c is similar to the system 68 but includes additional hydraulic circuit components, such as hydraulic accumulators 78. In some embodiments, each of the support assemblies 22 may include a single hydraulic actuator that both raises and lowers the chassis 12 and provides suspension functions, as explained below. Such hydraulic systems may require specialized hydraulic circuit components such as the hydraulic accumulators 78.

Figure 3D:
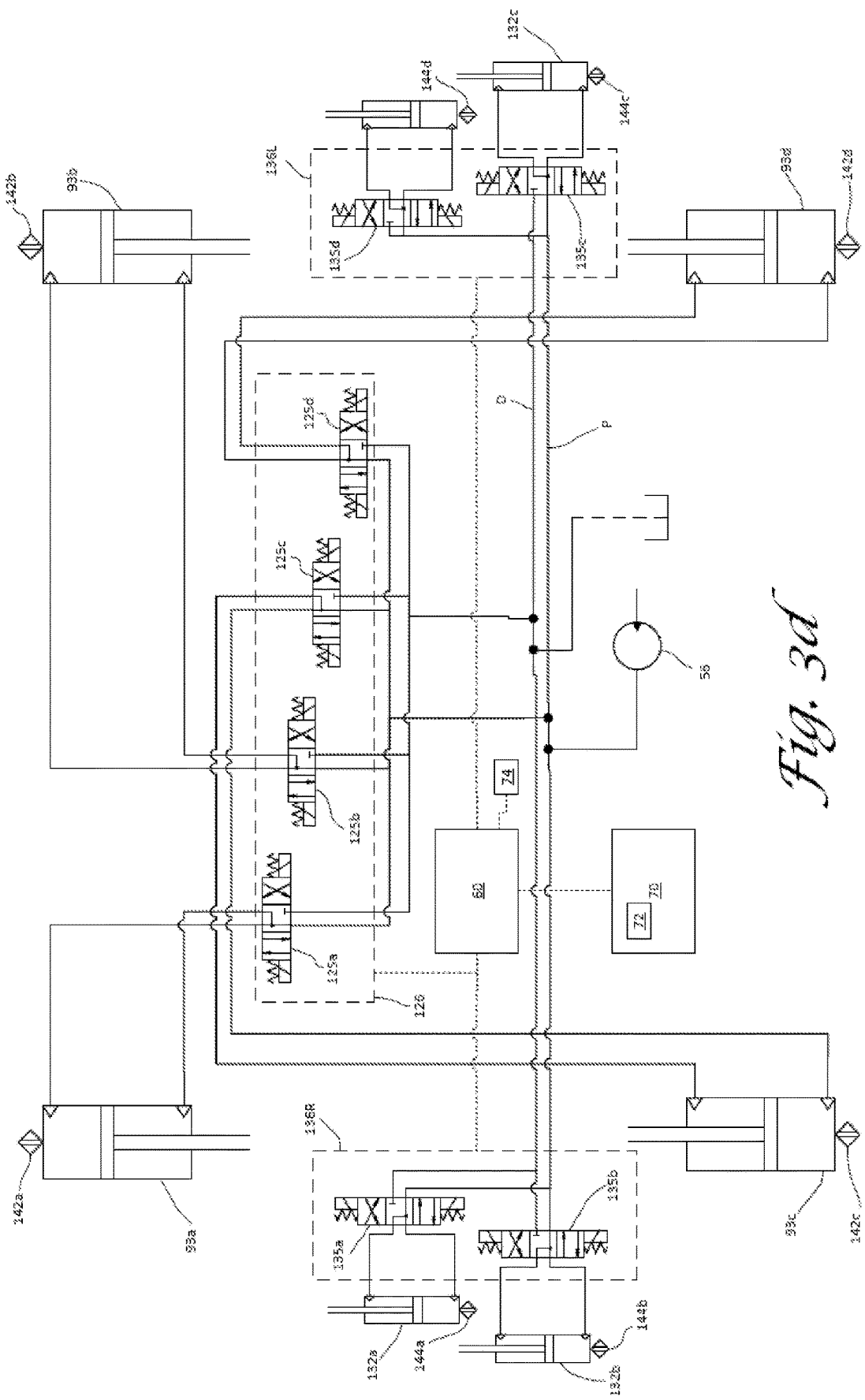
FIG. 3d is a diagram of a hydraulic circuit of an exemplary embodiment of a control system of the applicator of FIG. 1.
Figure 4:
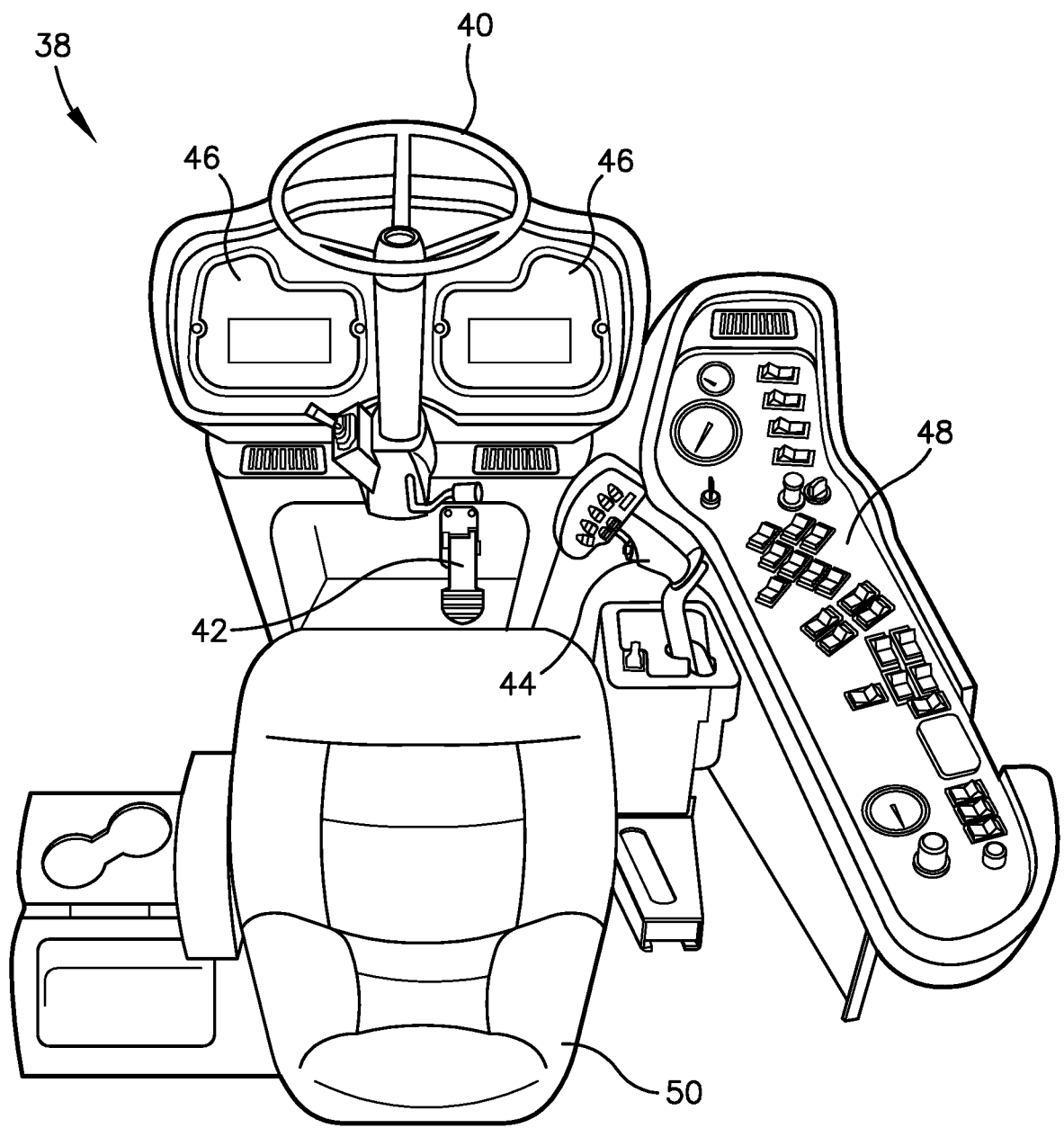
FIG. 4 illustrates certain features of a cabin of the applicator of FIG. 1 including user interface elements allowing a user to control certain functions of the applicator.
Figure 5:
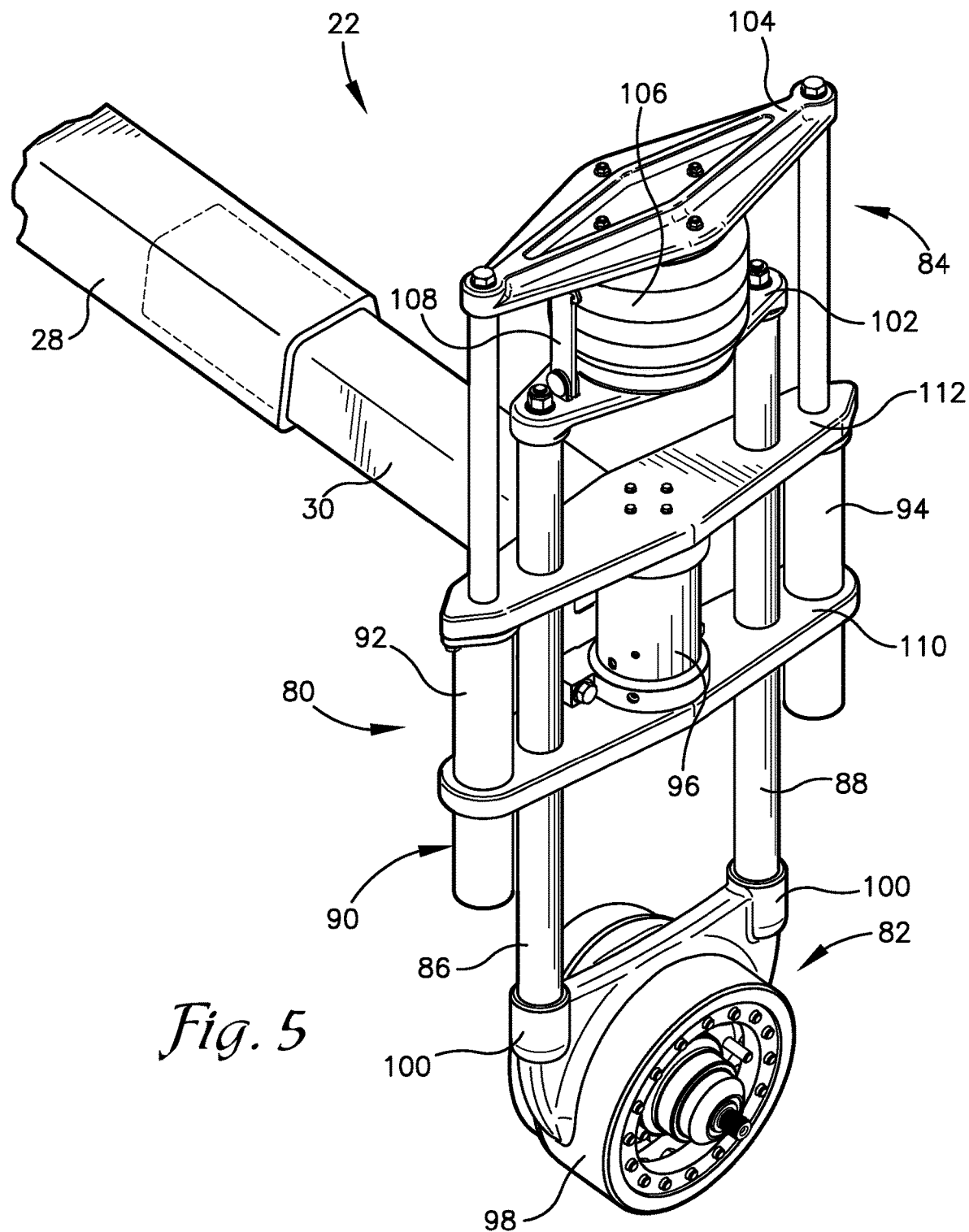
FIG. 5 is an outside perspective view of one of the support assemblies of the applicator of FIG. 2.
Figure 6:
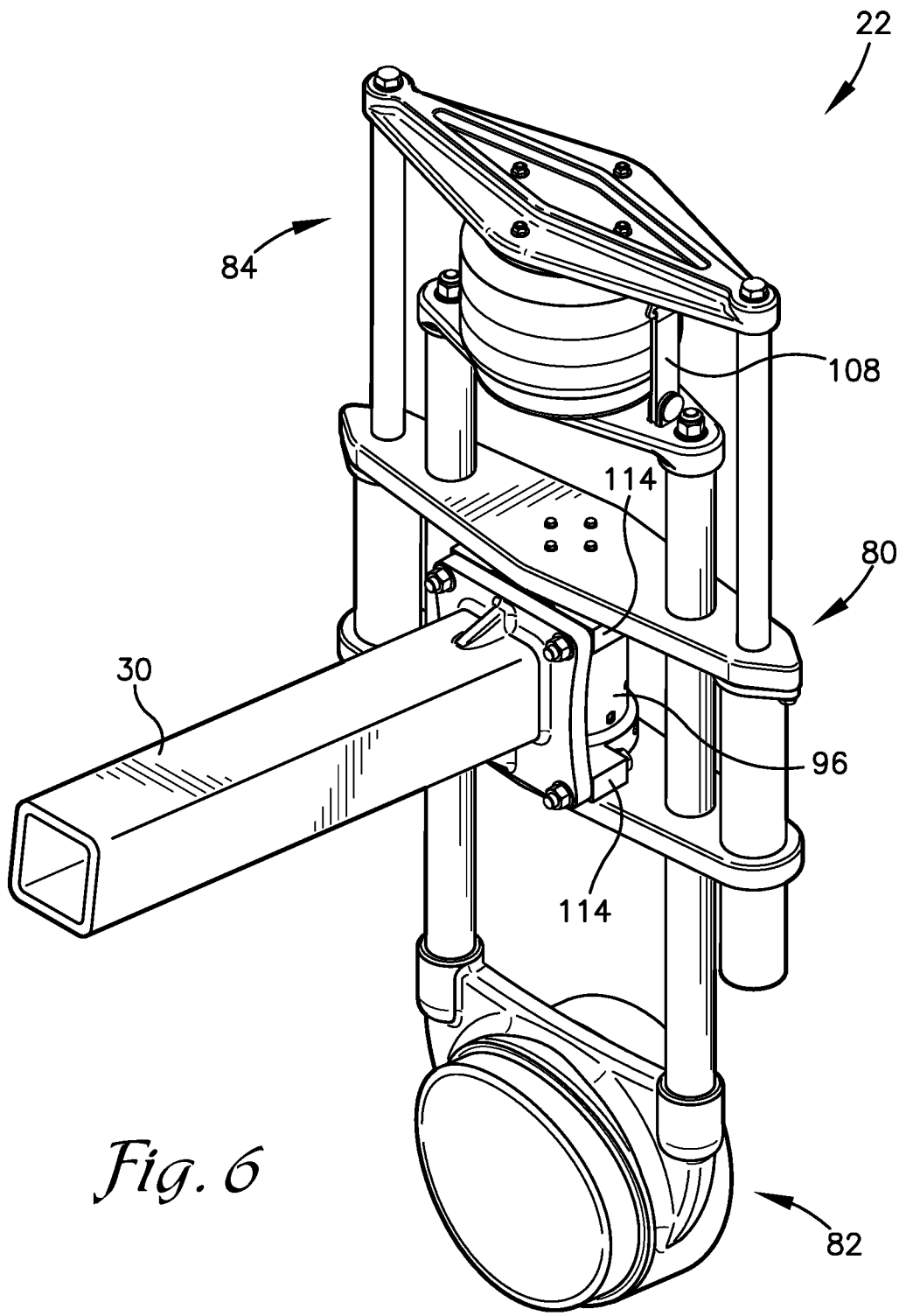
FIG. 6 is an inside perspective view of the support assembly of FIG. 5.
Figure 7:
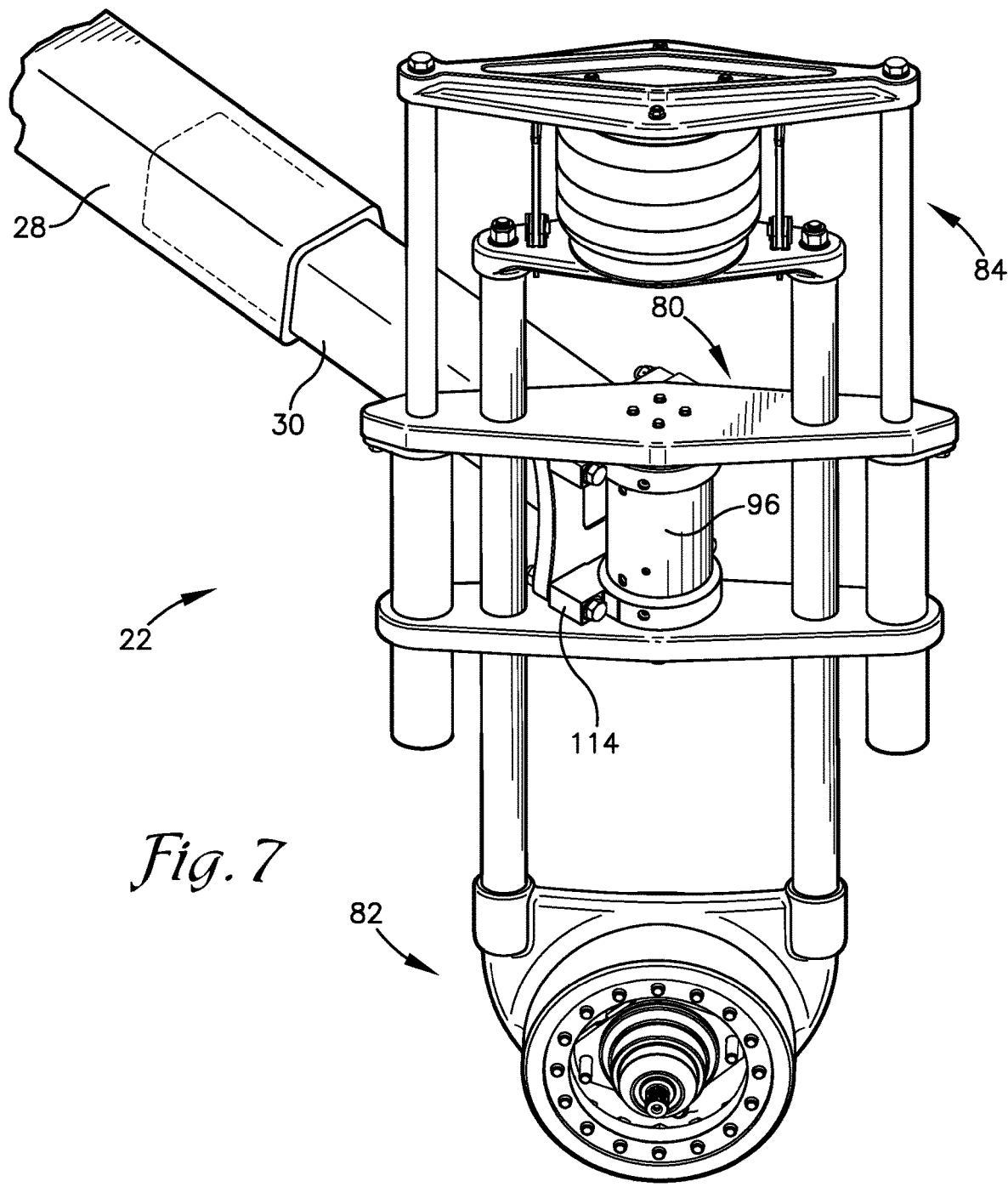
FIG. 7 illustrates the support assembly of FIG. 5 pivoted to a first position relative to an axle of the applicator.
Figure 8:
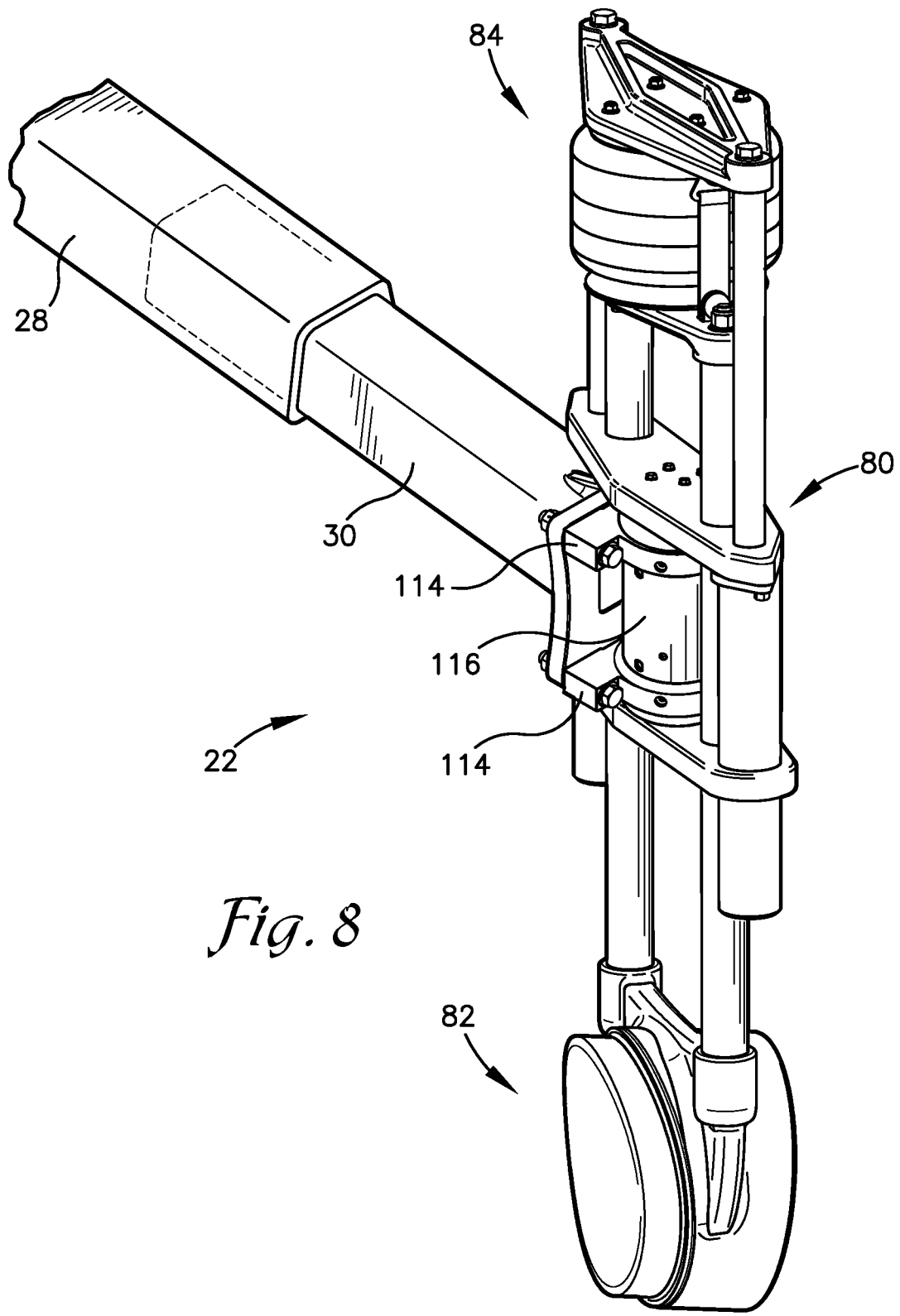
FIG. 8 illustrates the support assembly of FIG. 5 pivoted to a second position relative to the axle.
Figure 9:
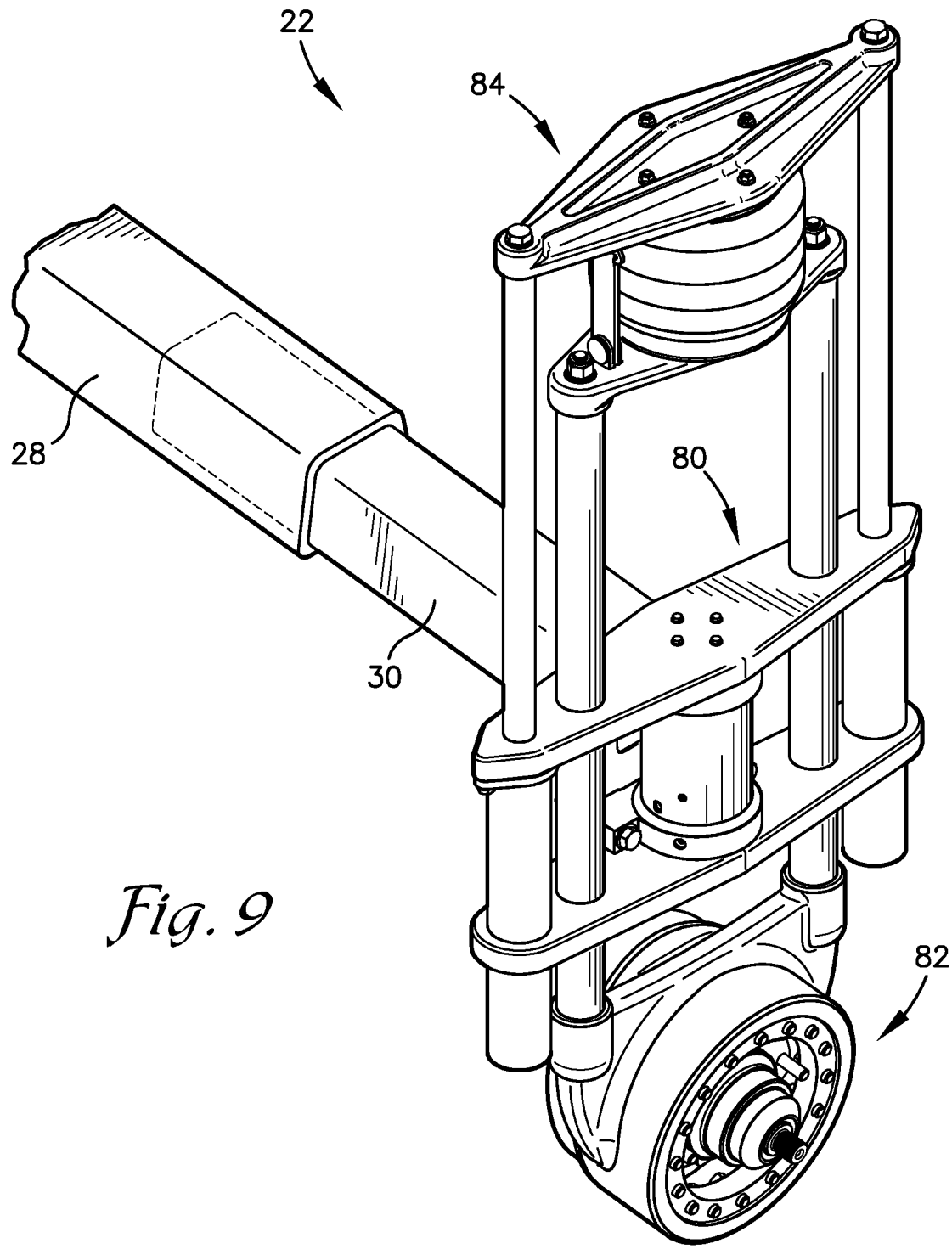
FIG. 9 illustrates the support assembly of FIG. 5 in a first operating position.

FIG. 3d illustrates an embodiment of a hydraulic control system 120 for controlling height adjustment cylinders 93a-d and track-width adjustment cylinders 132a-d. The height adjustment cylinders 93a-d are each associated with one of the support assemblies 22a-d, and are fluidly connected to a pressurized line 'P' and a drain line 'D' via respective 4-way 3-position directional height adjustment valves 125a-d. The height adjustment valves 125a-d are shown grouped together as a height adjustment control module 126, which is in electrical or wireless communication with hydraulic controller 60. Each height adjustment cylinder 93 is configured to extend to increase the height of the chassis 12 and to retract to decrease the height of the chassis 12. Although FIG. 3d illustrates only a single height adjustment cylinder 93 for each support assembly 22, two or more cylinders may instead be employed. For example, the embodiment of FIGS. 5-10 includes two height adjustment cylinders 92, 94. Some components of the hydraulic circuit are omitted from FIG. 3d for sake of clarity. For example, each cylinder may have associated therewith a pressure-relief or non-return valve as is standard practice.

Referring once again to FIG. 3d, a respective height position sensor 142 is mounted to, or associated with, each of the height adjustment cylinders 93 and configured to sense the extension of the associated height adjustment cylinder 93 and, in response, generate a signal representative of the extension of the height adjustment cylinder 93, this 'height signal' being communicated to the controller 70. In an alternative embodiment, the height position sensors 142 may instead be disposed remote from the height adjustment actuators 93 and instead sense the relative position between two components of the associated support assembly to generate a signal representative of the extension of the height adjustment cylinder 93. The controller 70 is thus arranged to receive, as a control input, a height signal for each support assembly 22.

The track-width adjustment cylinders 132a-d are each connected between one of the outer axles 28a-d and one of the inner axles 30a-d, and are fluidly connected to the pressurized line 'P' and drain line 'D' via respective 4-way 3-position directional track-width adjustment valves 135a-d. The directional track-width adjustment valves 125a, 125b associated with the right-hand wheels 14a, 14b are shown grouped together as a right-hand track-width adjustment control module 136R. The directional track-width adjustment valves 125c, 125d associated with the left-hand wheels 14c, 14d are shown grouped together as a left-hand track-width adjustment control module 136L. Both the track-width adjustment modules 136R, 136L are in electrical or wireless communication with hydraulic controller 60.

A respective track-width position sensor 144 is mounted to, or associated with, each of the height adjustment cylinders 132 and configured to sense the extension of the associated cylinder and, in response, generate a signal that is representative of the extension of the track-width adjustment cylinder 93, this 'track-width signal' being communicated to the controller 70. In an alternative embodiment, the track-width position sensors 144 may instead be disposed remote from the track-width adjustment cylinders 93 and instead sense the relative position between the inner and outer axles 28, 30 of the associated wheel 14 to generate a signal representative of the extension of that height adjustment cylinder 93. The controller 70 is thus arranged to receive, as a control input, a track-width signal for each wheel 14.

One of the support assemblies 22 is illustrated in greater detail in FIGS. 5-10. It should be understood that the assembly 22 is one example and many alternative constructions may be adopted instead. U.S. Pat. No. 9,180,747, referenced above, discloses a number of different support assembly configurations that may be adapted for implementing aspects disclosed herein.

The assembly 22 broadly includes a chassis attachment component 80 for attaching to the vehicle chassis 12; a wheel attachment component 82 for attaching to a wheel 14 or other ground-engaging element; a suspension component 84 operably interposed between the chassis attachment component 80 and the wheel attachment component 82 for regulating motion transfer between the two attachment components 80, 82; a plurality of strut bars 86, 88 connecting the wheel attachment component 82 to the suspension component 84, and a height adjustment mechanism 90 comprising a plurality of height adjustment actuators 92, 94 for shifting the wheel attachment component 82 between a plurality of operating positions relative to the chassis attachment component 80. The chassis attachment component 80 may include a pivot element 96 for allowing the assembly 22 to pivot relative to the chassis 12 and a pivot actuator may drive the pivoting motion to thereby steer a wheel or other ground-engaging element connected to the wheel attachment component 82. In the illustrated embodiment, the pivot element 96 is or includes a rotary actuator.

The wheel attachment component 82 has a generally cylindrical body 98 and a pair of upwardly-opening receptacles 100 for receiving and connecting to the strut bars 86, 88. The receptacles 100 are positioned on opposite sides of and above the cylindrical body 98. Pivot torque is transferred to the wheel attachment component 82 by the strut bars 86, 88 via the receptacles 100. The wheel attachment component 82 includes a plurality of apertures or other features spaced angularly around the body 98 for connecting to a hub of a wheel, a hydraulic motor and/or a gear reduction hub, a caliper disc brake assembly, a parking brake assembly, and/or similar components.

The suspension component 84 includes a lower suspension member 102, an upper suspension member 104, and a pneumatic spring 106 or similar motion-regulating element positioned between and attached to the upper and lower suspension members. The upper suspension member 104 is connected to a top side or portion of the spring 106 and the lower suspension member 102 is connected to a lower side or portion of the spring 106. Each of the upper 104 and lower 102 suspension members has an elongated shape and includes a plurality of apertures or other features for attaching to the spring 106. The lower suspension member 102 includes apertures or other features located proximate end portions thereof to facilitate connection to the strut bars 86, 88, and the upper suspension member 104 includes apertures or other features located proximate outer portions thereof to facilitate connection to the adjustment mechanism 90. In the illustrated embodiment, the upper suspension member 104 is longer than the lower suspension member 102, enabling attachment to the height adjustment actuators 92, 94 that are positioned outboard of the lower suspension member 102.

The pneumatic spring 106 uses trapped or compressed air or other fluid to regulate motion transfer between the chassis attachment component 80 and the wheel attachment component 82. The pneumatic spring 106 may contain air, water, nitrogen, antifreeze or other fluid and may be single, double, or triple convolute. A pair of flexible straps 108 may be positioned on opposite sides of the spring 106 to limit extension of the spring and a bumper may be positioned inside or outside the spring to limit spring compression. Other technologies may be used, including, for example, a coil-type compression spring and a shock-absorbing cylinder and piston assembly.

The suspension components 84 of the assemblies 22 may be the only components of the applicator 10 configured to regulate motion transfer between the wheels 14 (or other ground-engaging element) and the chassis 12. The outer axles 28, for example, may be rigidly connected to portions of the frame of the applicator 10. Furthermore, the suspension components 84 regulate motion transfer between the wheels 14 and the chassis 12 regardless of the operating position of the assemblies 22. Thus, the suspension components 84 perform essentially the same function regardless of whether the chassis 21 is in a lowered position (e.g., FIG. 12), a raised position (e.g., FIG. 13) or somewhere in between.

The first strut bar 86 and the second strut bar 88 are rigidly connected to the receptacles 100 of the wheel attachment component 82 and are rigidly coupled with the suspension component 84 such that movement of the wheel attachment component 82 relative to the chassis attachment component 80 is communicated through the suspension component 84 via the strut bars 86, 88. More specifically, a first end of the first strut bar 86 is connected to a first receptacle 100 of the wheel attachment component 82, and a first end of the second strut bar 88 is connected to a second receptacle 100 of the wheel attachment component 82. A second end of the first strut bar 86 is connected to a first side of the lower suspension member 102, and a second end of the second strut bar 88 is connected to a second side of the lower suspension member 102. As explained above, the lower suspension member 102 is an elongated, rigid member with outer apertures on opposing ends thereof for connecting to the strut bars 86, 88 and one or more inner apertures between the outer apertures for rigidly attaching to a first side or portion of the spring 106. Thus, the lower suspension member 102 interconnects the spring 106 and the strut bars 86, 88.

The first and second strut bars 86, 88 are parallel or substantially parallel and are separated by a space. The strut bars 86, 88 slidingly engage the chassis attachment component 80 to allow the wheel attachment component 82 to move relative to the chassis attachment component 80 while also transferring pivot torque between the wheel attachment component 82 and the chassis attachment component 80. The strut bars 86, 88 may be separated by a space of between about 3 inches (7.6 cm) and 20 inches (51 cm) and, more specifically, may be separated by a space of between about 8 inches (20 cm) and about 15 inches (38 cm). The length of each of the strut bars 86, 88 may be between about 12 inches (30 cm) and about 36 inches (91 cm) and, more specifically, between about 20 inches (51 cm) and about 30 inches (76 cm). The strut bars 86, 88 may be positioned symmetrically about a center of the wheel attachment component 82 and a center of the chassis attachment component 80.

The chassis attachment component 80 comprises a lower chassis attachment member 110 and an upper chassis attachment member 112 separated by a space. The pivot element 96 is interposed between, and rigidly connected to, the attachment members 110, 112. Each of the lower 110 and upper 112 chassis attachment members includes a pair of spaced through-holes in axial alignment for slidingly receiving the strut bars 86, 88. Each of the lower 110 and upper 112 chassis attachment members also includes a pair of apertures or other features positioned outboard of the through-holes for engaging the height adjustment actuators 92, 94.

The chassis attachment component 80 is rigidly but adjustably coupled with the upper suspension member 104 via the height adjustment actuators 92, 94 such that actuating the adjustment mechanism 90 causes the upper suspension member 104 to shift relative to the chassis attachment component 80, shifting the wheel attachment component 82 relative to the axle 30. The lower suspension member 102 is rigidly connected to the wheel attachment component 82 via the strut bars 86, 88, as explained above, such that motion transfer between the chassis attachment component 80 and the wheel attachment component 82 passes through, and is regulated by, the suspension component 84. Such motion transfer may correspond to up-and-down movement of the wheels 14 relative to the chassis 12 such that the suspension component 84 may provide a spring or shock-absorbing function and may, for example, dampen motion transfer between the wheels 14 and the chassis 12.

The height adjustment mechanism 90, comprising the height adjustment actuators 92, 94, is configured to shift the wheel attachment component 82 between a plurality of operating positions relative to the chassis attachment component 80. As used herein, an "operating position" is a selectable position of the wheel attachment component 82 relative to the chassis attachment component 80 in which the distance between the attachment components 80, 82 is rigidly or flexibly fixed. If the distance between the attachment components 80, 82 is flexibly fixed, the relative positions of the attachment components may fluctuate but will return to the same operating position. Stated differently, the average distance between the attachment components 80, 82 will remain the same even though the instantaneous distance may fluctuate above and/or below the average distance. Fluctuations in the relative positions of the attachment components 80, 82 may result, for example, from operation of the suspension component 84, operation of a hydraulic component, or both.

Figure 10:
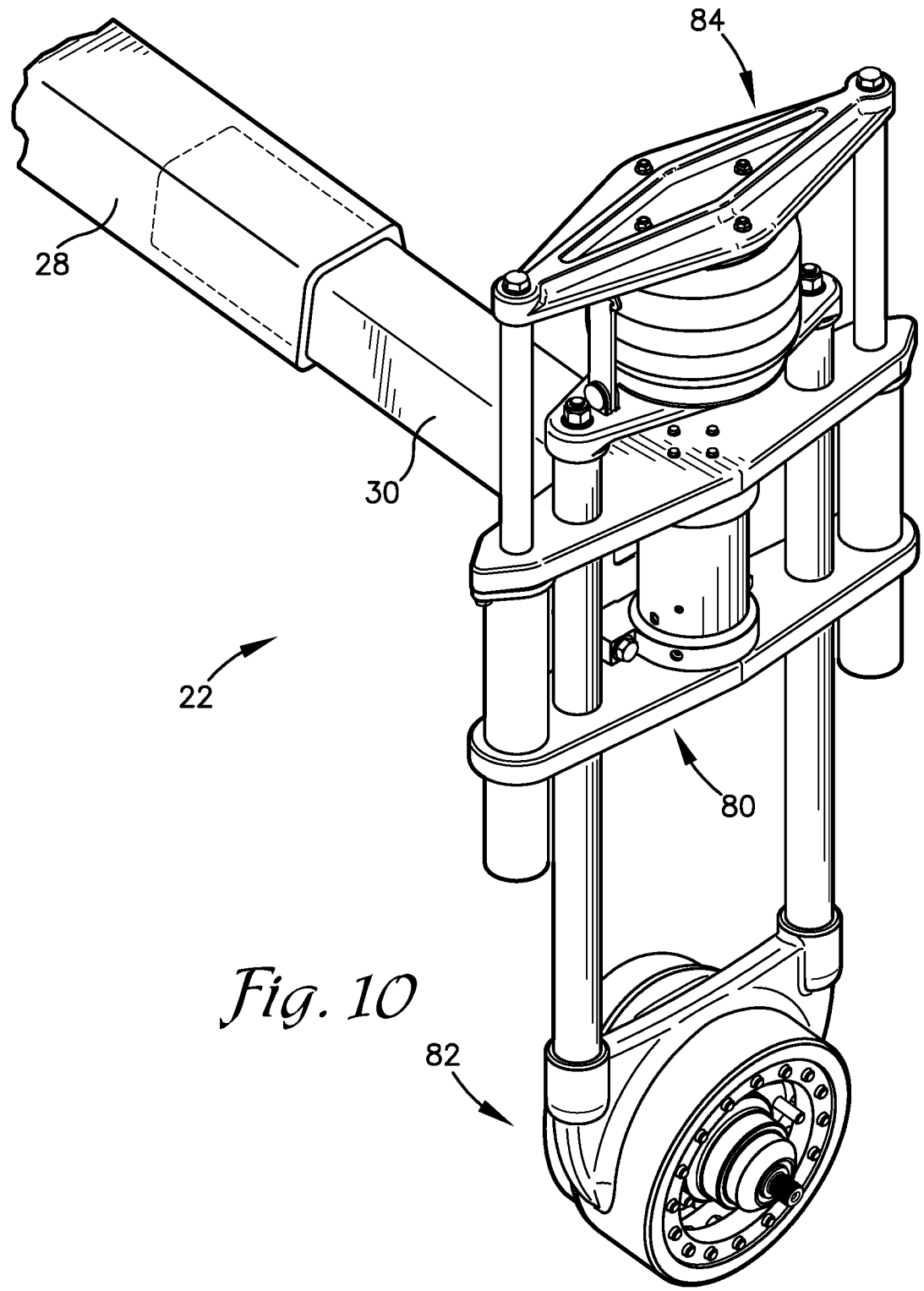
FIG. 10 illustrates the support assembly of FIG. 5 in a second operating position.

In operation, shifting the wheel attachment component 82 between operating positions relative to the chassis attachment component 80 will raise and lower the vehicle's chassis 12 between various operating positions relative to the ground surface. Each assembly 22 is operable to shift between two or more operating positions, such as, for example, between two, three, four, five, six, seven, eight, nine, ten, twelve, fourteen, or sixteen operating positions. Additionally, each assembly 22 may be infinitely adjustable between a first extreme operating position (FIG. 9) and a second extreme operating position (FIG. 10). The difference between the first extreme operating position and the second extreme operating position may be within the range of about 5 inches (13 cm) to about 50 inches (130 cm). More specifically, the difference may be about 10 inches (25 cm), about 20 inches (51 cm), about 30 inches (76 cm), or about 40 inches (102 cm).

As illustrated, the height adjustment actuators 92, 94 are connected to the upper and lower chassis attachment members 110, 112 and to the upper suspension member 104, such that extending or retracting the height adjustment actuators 92, 94 causes the upper suspension member 104 (and a top end or portion of the spring 106 to which it is connected) to shift up or down relative to the chassis attachment component 80. The height adjustment actuators 92, 94 may include fluid actuators and/or electro-mechanical actuators. By way of example, the height adjustment actuators 92, 94 may include hydraulic cylinders that drive piston rods between retracted and extended positions.

As used herein, the suspension component 84 is "operably interposed" between the wheel attachment component 82 and the chassis attachment component 80 if it regulates motion transfer between the two components 80, 82. Thus, the suspension component 84 need not be positioned physically between the attachment components 80, 82 in order to be operably interposed therebetween. As illustrated, the suspension component 84 may be positioned above (and in line with) both the wheel attachment component 82 and the chassis attachment component 80 and yet be operably interposed therebetween.

The assembly 22 is configured to pivot relative to the axle 30 to pivot a wheel coupled with the wheel attachment component 82 and steer the applicator 10. The assembly 22 may pivot between a first extreme position (FIG. 7) and a second extreme position (FIG. 8) about an axis of rotation passing through, and defined by, the pivot element 96. The extreme pivot positions may correspond to an angular separation of between, for example, about 90° and about 300°. The assembly 22 pivots as a single unit such that the wheel attachment component 82, the chassis attachment component 80, and the suspension component 84 pivot in unison, regardless of the position of the wheel attachment component 82 relative to the chassis attachment component 80.

In the illustrated embodiment, the pivot element 96 attaches to an outer end of the axle 30, the suspension component 84 is positioned above the axle 30, and the wheel attachment component 82 is positioned below the axle 30 opposite the suspension component 84. Furthermore, the wheel attachment component 82, the chassis attachment component 80, and the suspension component 84 lie on a line that corresponds to, or is parallel with, the axis of rotation of the assembly 22.

The pivot element 96 may include a rotary hydraulic actuator connected to the axle 30 and to the lower 110 and upper 112 chassis attachment members. The rotary hydraulic actuator selectively drives pivoting movement of the assembly 22 relative to the chassis 12, and may be controlled by a vehicle operator or an automated guidance system to steer the applicator 10.

By way of example, the rotary actuator may be a Helac L30 series helical hydraulic rotary actuator available from Parker Hannifin, Cylinder Division, of Des Plaines, Illinois, or a similar device. A rotary hydraulic actuator is a device manufactured to drive or induce rotational movement in response to hydraulic input. Thus, a portion of the rotary actuator rotates relative to another portion of the rotary actuator and does not require external connections or components to generate rotational motion. A rotary actuator may be designed, for example, to internally translate linear motion into rotational motion. In one exemplary embodiment, the rotary hydraulic actuator may generate output torque of between 3,000 foot-pounds (4,070 N-m) and 32,000 foot-pounds (43,400 N-m) at a hydraulic pressure of between 2,000 psi (138 bar) and 4,000 psi (276 bar) or, more specifically, may generate torque of between 10,000 foot-pounds (13,600 N-m) and 25,000 foot-pounds (33,900 N-m) at a hydraulic pressure of between 2,000 psi (138 bar) and 4,000 psi (276 bar). The rotary actuator may have a total angular displacement of between about 90° and about 360°.

The illustrated rotary hydraulic actuator 96 includes a plurality of spaced mounting feet or flanges 114 for securing to the axle 30 or other part of the chassis 12 and a cylindrical housing 116 with opposing ends that mount to, and rotate, the lower and upper chassis attachment members 110, 112. In the illustrated embodiment, the mounting feet 114 are configured to attach to a plurality of attachment points arranged in a planar configuration, such as on a single planar surface. Thus, the rotary actuator 96 may function both to mount the chassis attachment component 80 to the axle 30 and to rotate the assembly 22 relative to the axle 30 and, therefore, may simplify the design, manufacture, maintenance, and repair of the assembly 22 and related components. The housing 116 may have a diameter of between about 5 inches (13 cm) and 12 inches (30 cm) and a length of between about 11 inches (28 cm) and about 40 inches (102 cm). It will be appreciated by those skilled in the art that the rotary actuator 116 and the connections between the rotary actuator 96 and the assembly 22 and the axle 30 must be sufficiently strong to sustain the shock and rigors of routine use.

Rather than including a rotary actuator, the assembly 22 may include, or may be coupled with, another type of actuator such as a linear hydraulic actuator for driving pivoting motion. Alternatively, the assembly 22 may be configured to rigidly attach to the vehicle chassis 12 and not pivot relative to the chassis, wherein the chassis attachment component 80 is rigidly attached to the inner axle 30 or other portion of the chassis 12. This may be desirable, for example, when the assembly 22 supports a ground-engaging element that is not intended to steer the applicator 10. The chassis attachment component 80 may be rigidly attached to the axle 30 by replacing the pivot element 96 with a casting of the same size and shape as the pivot element 96 to rigidly connect to the chassis attachment component 80 and to the axle 30. The assembly 22 may be configured to facilitate interchanging a rotary actuator configured to pivot the assembly and a static component configured to secure the assembly in a fixed position. Bolts or other easily removable attachment elements may be used to secure the rotary actuator 96 to the axle 30 and to the assembly 22 and may be positioned to facilitate access thereto. Thus, an actuator and a fixed element may both be provided with each of the assemblies 22 such that a user may interchange the actuator and the fixed element as desired.

In operation, the assemblies 22 raise and lower the chassis of the applicator 10. More specifically, an operator may remotely control operation of the assemblies 22 to raise and lower the chassis 12 using, for example, one of the user interface elements forming part of the control environment 38 illustrated in FIG. 4. Thus, the operator may raise and lower the chassis 12 while seated in the cabin 18.

In one exemplary scenario, the operator fills the holding tank 32 at a central location, such as a local cooperative facility, and drives the applicator 10 to a field in a lowered operating position. Once at the field, the operator controls the assemblies 22 to raise the chassis 12 to a desired height to apply the product. The operator raises the chassis 12 while seated in the cabin 18. When the application is complete or before the applicator 10 returns to the cooperative for additional product, the operator lowers the chassis 12 and drives the applicator 10 to the cooperative or to another field. Adjusting the height of the chassis 12 allows for safer travel to and from the field by lowering the applicator's center of gravity and overall height.

In another exemplary scenario, the applicator 10 and a tender vehicle are taken to an area of application, such as a field or group of fields. The applicator 10 is placed in a lowered chassis position and prepared by filling it with liquid chemical or other product to be applied to a crop. The tender vehicle may be configured to interface with the applicator 10 only when the applicator 10 is in a lowered chassis position. When the applicator 10 is prepared, the operator may drive the applicator 10 to a starting position, raise the chassis 12 to a desired height using one or more interface elements within the cabin 18, and begin the application process. The operator refills the applicator 10 by returning to the tender vehicle, lowering the applicator chassis 12 to interface with the tender vehicle, and then raising the chassis 12 after the applicator 10 has been refilled to resume the application operation. When application for a first crop is complete, the applicator 10 may be used to apply a chemical to a second crop of a different height than the first crop. The operator may adjust the chassis height of the applicator 10 for application on the second crop, wherein a selected height for application on the second crop may be different than a selected height for application on the first crop.

Height Tolerance Control

Figure 11:
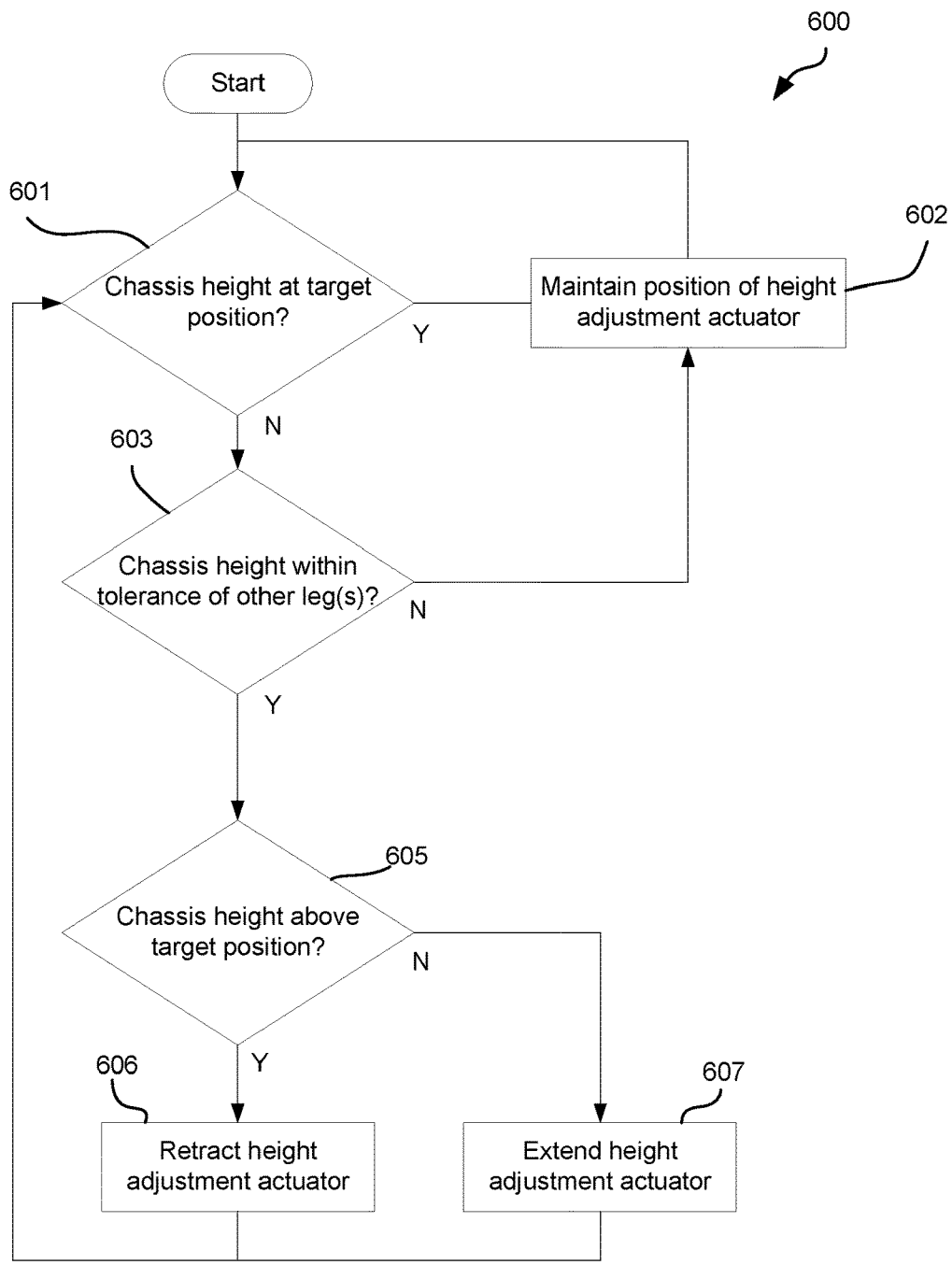
FIG. 11 is a flow diagram illustrating a method of controlling a chassis-height adjustment system.

With reference to FIG. 11 a method 600 of controlling the height adjustment mechanisms 90 may improve the ergonomic experience of the operator by reducing the occurrence of non-uniform chassis height adjustment. The method 600 involves monitoring the height signals and stopping any adjustment of a first support assembly if a differential in height signal of that assembly compared to any one of the other three support assemblies exceeds a predetermined tolerance value. In one embodiment, the method 600 is implemented by controller 70. The description that follows is given in relation to only one of the wheels 14 and associated support assembly 22 but it should be understood that the method 600 may be executed simultaneously for each wheel 14 and associated support assembly 22 with height adjustment cylinder 93. Reference is invited also to FIG. 3d, which illustrates most of the components involved in implementing the method 600 as described hereinafter.

In a first step 601, the height signals from each of the height position sensors 142 are monitored to determine whether any adjustment of the height of that support assembly 22 is necessary. A target height position $h_t$ for each support assembly 22 may be received by the controller 70 from an operator via one of the user interface panels 46, 48. Alternatively, the controller 70 may determine a target height position $h_t$ for each support assembly 22 using a control algorithm having input parameters such as crop canopy height, vehicle speed, and/or topographical data. It should be understood that the target height position $h_t$ for each support assembly may differ from that of the other support assemblies.

The height signal for each support assembly 22 is representative of an actual height position $h_a$. It should also be understood that the target height position $h_t$ and the actual height position $h_a$ as described herein is in relation to the relative positions between the wheel 14 of a given support assembly 22 and the chassis 12 as defined by the associated height adjustment actuator 93, between the wheel attachment component 82 and the chassis attachment component 80 of the associated support assembly 22 described above.

If the actual height position $h_{a-a}$ for the first support assembly 22a is at, or within a predetermined range of, the target height position $h_{t-a}$ then no height adjustment of the first support assembly 22a is necessary and, as indicated at step 602, the position of height adjustment cylinder 93a is maintained.

If, however, the actual height position $h_{a-a}$ for the first support assembly 22a is not at, or within a predetermined range of, the target height position $h_{t-a}$ then the controller 70 addresses the condition shown at step 603 in which the actual height position $h_{a-a}$ (as represented by the first height signal) is compared to the height signals corresponding to the other height adjustment cylinders 93b, 93c, 93d. If the actual height position $h_{a-a}$ of the first height adjustment cylinder 93a is within a height tolerance range $h_x$ then the first height adjustment cylinder 93a will be, or continue to be adjusted as per steps 605-607.

If, however, the actual height position $h_{a-a}$ of the first height adjustment cylinder 93a is outside the height tolerance range $h_x$, then movement of the first height adjustment cylinder 93a is stopped or prevented and the position is maintained. To represent algebraically, if $$|h_{a-a} - h_{a-b,c,d}| > h_x$$

wherein $h_{a-b,c,d}$ is the average of the actual height positions of the other height adjustment cylinders 93b, 93c, 93d, then movement of the first height adjustment cylinder 93a is stopped or prevented and the position is maintained.

The tolerance range $h_x$ may be predetermined and stored by the controller 70, and may be a constant value or proportional to the actual height position $h_a$.

As set out at steps 605-607, the direction of adjustment of the height adjustment cylinder 93a is determined by whether the actual height position $h_{a-a}$ is above or below the target height position $h_{t-a}$.

The method 600 is executed continuously or periodically to prevent any substantial non-uniformity in chassis height adjustment. When a chassis height adjustment is executed, all height adjustment control valves 125 may be opened simultaneously to cause a flow of hydraulic fluid to or from the height adjustment cylinders 93 and raise all four corners of the chassis 12 together. However, hydraulic flow will inherently go to the path of least resistance. If less or no hydraulic flow passes one or more of the valves 125, then a differential in height adjustment may occur between the height adjustment cylinders 93 and result in non-uniform adjustment. In operation, the method 600 advantageously intervenes to close the height adjustment control valve 125 associated with the fastest hydraulic flow (and thus the fastest adjustment as sensed by the sensors 142) to force more flow through the other valves 125 and allow them to catch up.

Track-Width Tolerance Control

Figure 12:
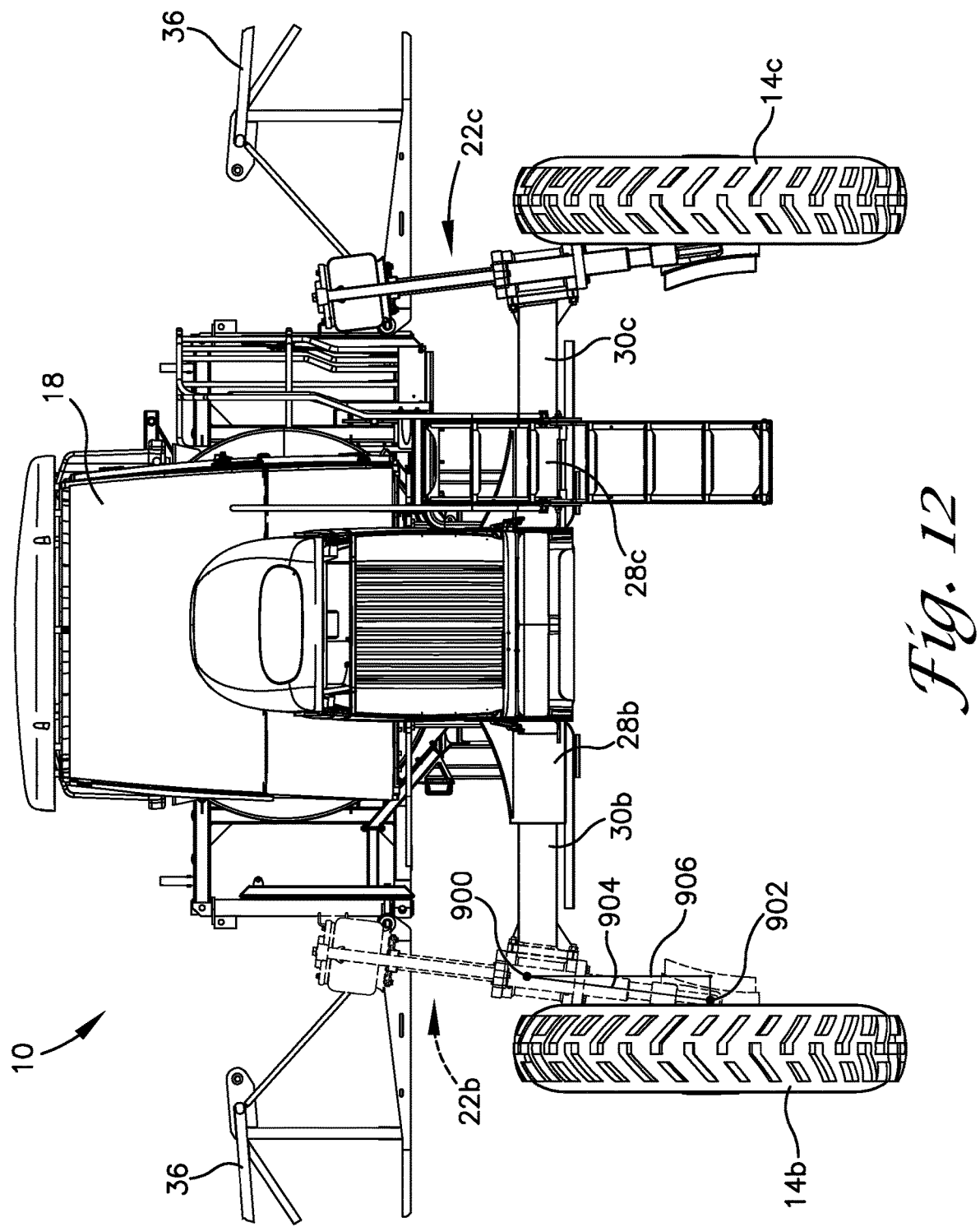
FIG. 12 is a front elevation view of the applicator of FIG. 1, illustrating the applicator chassis in a lowered operating position.
Figure 13:
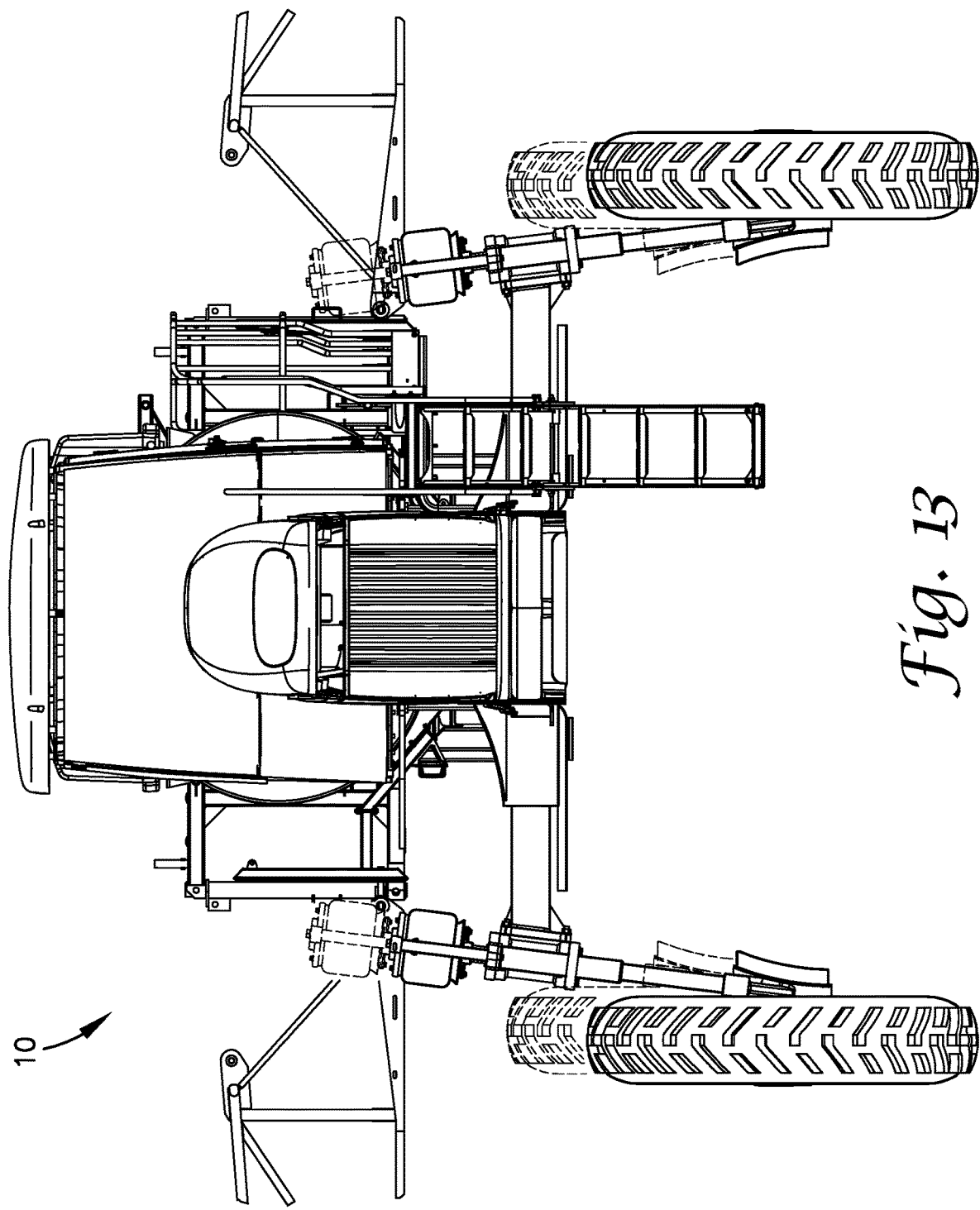
FIG. 13 is a front elevation view of the applicator of FIG. 1, illustrating the applicator chassis in a raised operating position and the position of the wheels and support assemblies corresponding to the lowered operating position of FIG. 12 illustrated in broken line.
Figure 14:
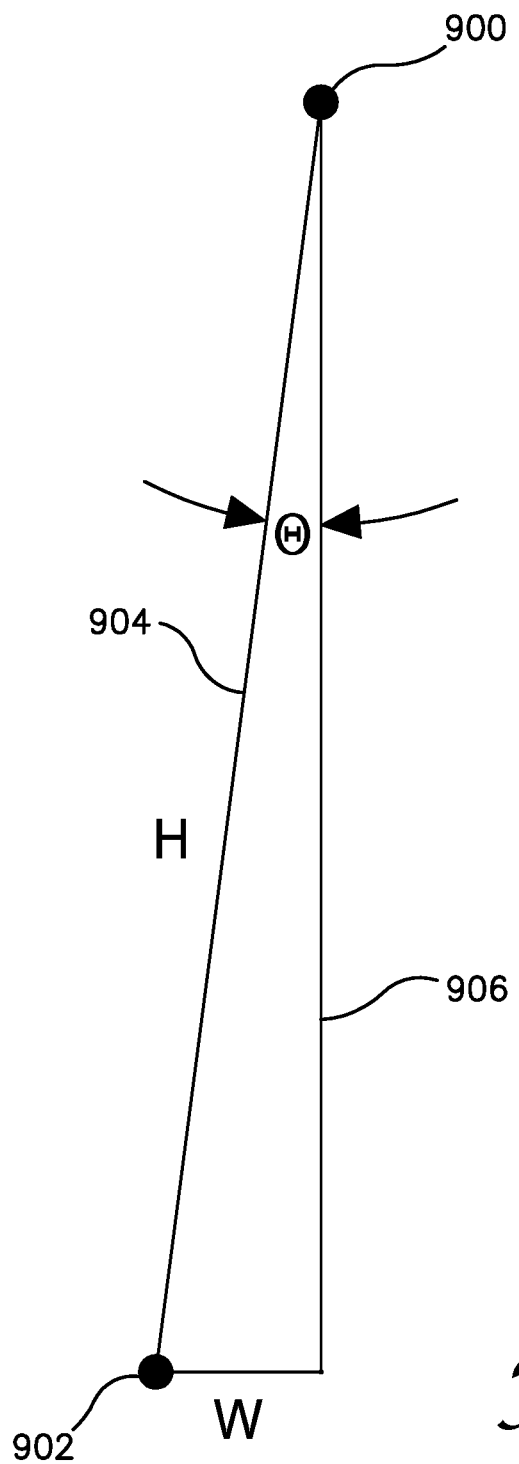
FIG. 14 is a diagram illustrating the kingpin angle of the support assemblies illustrated in FIGS. 12 and 13.

With reference now to FIGS. 12-14, the track width of the applicator 10 is illustrated as the distance between the wheels 14a, 14b on a first side of the applicator 10 and the wheels 14c, 14d on a second side of the applicator 10. As explained above, the applicator 10 includes a track-width adjustment system including telescoping axles 28, 30 and actuators 132 (FIG. 3d) moving the inner axles 30 between extended and retracted positions. The track width may be infinitely adjustable between, for example, about 120 inches (305 cm) and about 152 inches (386 cm).

The applicator 10 may be configured such that the support assemblies 22 are not parallel with the direction of vertical movement of the chassis 12 when the support assemblies 22 are used to adjust the height of the chassis 12. As illustrated in FIG. 12, each support assembly 22 connects to the chassis 12 at a chassis connection point 900 and connects to one of the wheels 14 at a wheel connection point 902. A straight line 904 interconnecting the chassis connection point 900 and the wheel connection point 902 is angled relative to vertical movement of the chassis 12 and is also angled relative to a vertical longitudinal axis of the wheel 14. Line 906 represents the direction of vertical movement of the chassis 12 and the direction of the vertical longitudinal axis of the wheel 14. This angled position of the assemblies 22 may be desirable for several reasons, including providing sufficient separation between the support assembly 22 and the wheel 14 and providing an optimal steering configuration.

As illustrated in FIG. 13, the angled position of the assemblies 22 relative to the vehicle's frame presents certain challenges to use of the support assembly 22 to raise and lower the vehicle's chassis 12. As the support assemblies 22 are actuated to raise the chassis 12, for example, the wheels 14 are also pushed laterally outward away from the vehicle's chassis 12. This may present a problem because some surfaces may prevent the wheels 14 from sliding relative to the chassis 12, particularly if the applicator 10 is loaded with product. In these situations, the operator may be required to raise and lower the applicator 10 while the applicator 10 is travelling forward or backwards. Furthermore, it may be undesirable to operate the applicator 10 at a new track width such that the operator must re-adjust the track width to the desired amount each time he or she adjusts the height of the chassis 12. As explained above, re-adjusting may conventionally be performed while the applicator 10 is moving.

To address the problems associated with lateral movement of the wheels 14 that occurs when the applicator height is adjusted, the control system 68 may be configured to automatically adjust the track width as the height of the applicator 10 is adjusted such that the wheels 14 do not move laterally relative to the ground surface as the applicator 10 is raised and lowered. With particular reference to FIG. 14, if the support assembly 22 is positioned at an angle of inclination θ relative to the direction of travel of the chassis 12, the change in lateral position of the wheel ΔW is defined as $\Delta W = \sin(\theta) \times \Delta H$, where ΔH is the change in the distance between the chassis point of connection 900 and the wheel point of connection 902 along the line 109. In this equation, ΔW represents the change in lateral position of one of the wheels 14 or, in other words, the wheels 14 on one side of the applicator 10. The total change in track width is defined as twice that amount, or 2×ΔW.

The control system 68 may be configured such that as the operator adjusts the height of the applicator 10 using, for example, a button or dial located in the cabin 18, the control system 68 detects the height adjustment and automatically adjusts the track width accordingly to preserve the track width of the applicator 10. Alternatively, the control system 68 may be configured to actuate both the chassis-height adjustment system and the track-width adjustment system. In this implementation, the user may adjust the chassis height via a user interface element, wherein the control system 68 actuates the height adjustment system to adjust the chassis height to the desired height and also adjusts the track-width system to preserve the track-width of the applicator. In either implementation, the control system 52 adjusts the track width according to the equation $\Delta W = \sin(\theta) \times \Delta H$, explained above. Continuously or periodically, the controller 70 may determine a target track width $w_t$ based on this equation.

With reference to FIG. 3d, the height adjustment cylinders 93 and the track-width adjustment cylinders 132 share a common hydraulic circuit and pressure source 56. When the height adjustment cylinders 93 and the track-width adjustment cylinders 132 are operated or commanded simultaneously as described above, hydraulic flow will inherently go to the path of least resistance. If less or no hydraulic flow passes one or more of the valves 125, 135 then a differential in height and/or track width adjustment may occur and result in non-uniform adjustment. For example, the height of one or more support assemblies 22 may adjust faster than the track width, causing lateral scrubbing of the wheels across the ground as the chassis is raised or lowered.

Figure 15:
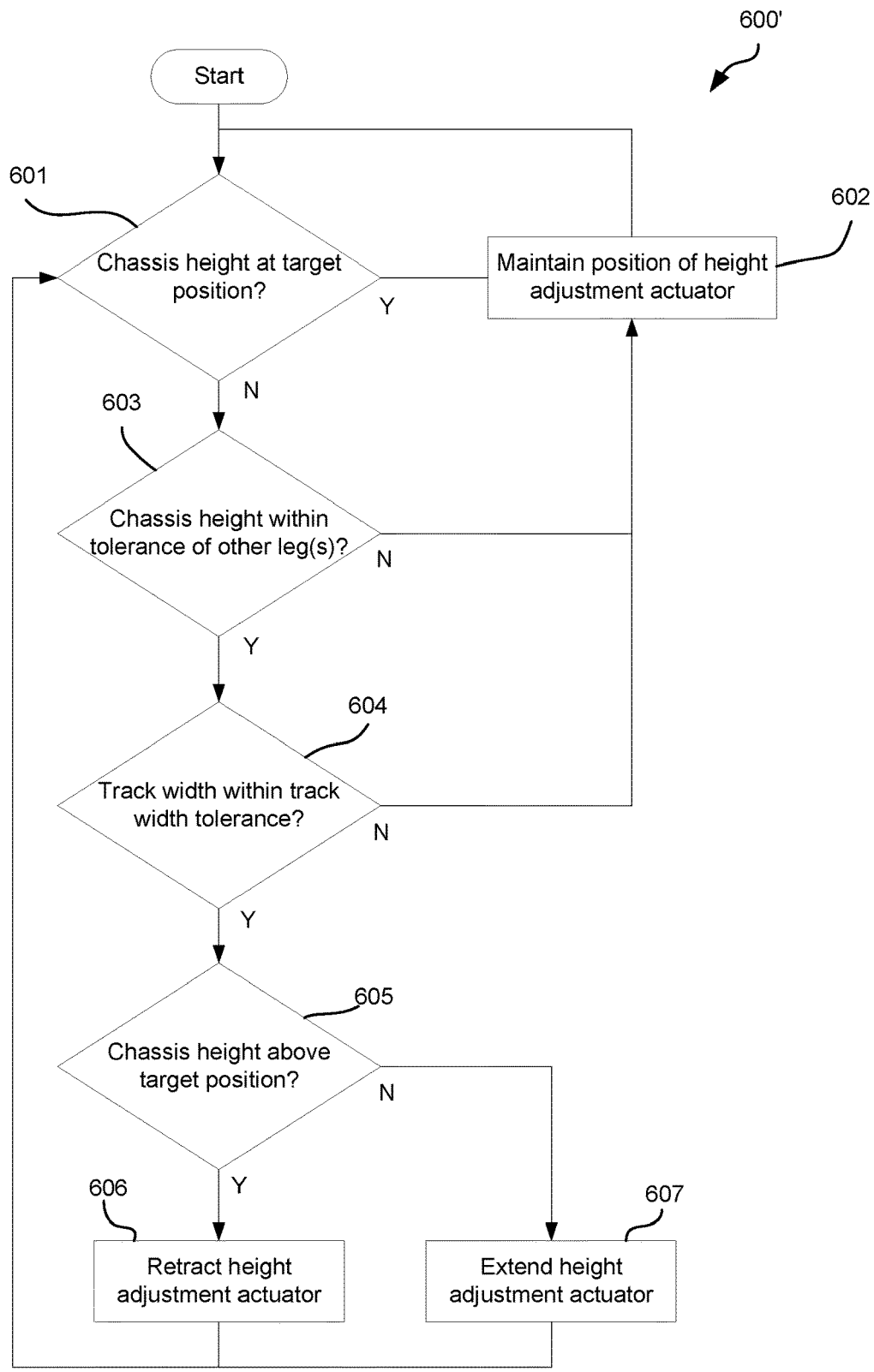
FIG. 15 is a flow diagram illustrating a method of controlling a chassis-height adjustment system in accordance with another embodiment.

In accordance with another embodiment shown in FIG. 15, a method 600' of operating the control system 68 advantageously intervenes to close or restrict the height adjustment control valve or valves 125 associated with the fastest hydraulic flow (and thus the fastest adjustment as sensed by the sensors 142) to force more flow through the other valves 125, 135 and allow them to catch up, thus improving the synchronization between all adjustment cylinders 93, 132.

The method 600' is the same as the method 600 described above except that an additional condition is met before adjustment of the height adjustment actuators 93 is permitted. If the controller 70 determines at step 603 that the actual height position $h_{a-a}$ of the first height adjustment cylinder 93a is within a height tolerance range $h_x$, then the controller 70 determines, at step 603, whether the actual track width $w_a$ is within a track width tolerance range $w_x$ compared to the target track width $w_t$.

The actual track width $w_a$ is calculated from the track-width signals generated by the track-width adjustment sensors 144. As explained above, the target track width $w_t$ at any stage may be calculated based upon the actual height position $h_a$ using the relationship $\Delta W = \sin(\theta) \times \Delta H$.

If the actual track width $w_a$ is within the track width tolerance range $w_x$ then the first height adjustment cylinder 93a will be, or continue to be adjusted as per steps 605-607.

If, however, the actual track width $w_a$ is outside the track width tolerance range $w_x$ then movement of the first height adjustment cylinder 93a will be stopped or prevented and the position will be maintained. To represent algebraically, if $$\uparrow |w_a - w_t| > w_x$$

then movement of the first height adjustment cylinder 93a is stopped or prevented and the position is maintained.

In another embodiment, step 603 can be omitted from method 600', and the chassis height adjustment of a given support assembly 22 is synchronized with the track width adjustment but not necessarily with the adjustment positions of the other support assemblies.

In summary a chassis-height adjustment system is configured for selectively raising and lowering a chassis relative to a ground surface. The system includes a plurality of support assemblies supporting a chassis on respective ground-engaging elements. Each support assembly has a height adjustment actuator. Height position sensors are provided to sense an adjustment position of a respective one of the height adjustment actuators and generate a height signal. Each of the support assemblies may be mounted to the chassis by a respective track-width adjustment mechanism having a track-width adjustment actuator which is configured to shift the position of the associated ground-engaging element laterally relative to the chassis. The height adjustment system is controlled in a manner to synchronize each height adjustment actuator with the other actuators. Adjustment of one or more height adjustment actuators is slowed or stopped in the event that other actuators need to catch up.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

The invention claimed is:

1. A method of controlling a chassis-height adjustment system for selectively raising and lowering a chassis relative to a ground surface, the system comprising:
   a chassis;
   a plurality of ground-engaging elements supporting the chassis above a ground surface;
   a plurality of track-width adjustment mechanisms mounted to the chassis, each track-width adjustment mechanism comprising a telescoping axle coupled with a respective one of the ground-engaging elements and a track-width adjustment actuator configured to move each axle between a retracted position and an extended position;
   a plurality of support assemblies supporting the chassis on the ground-engaging elements and each comprising a height adjustment actuator, wherein each support assembly defines a line of connection between a ground-engaging element attachment point and a chassis attachment point, each line of connection defining a non-zero angle θ corresponding to an angle of deviation from a direction of vertical travel of the chassis;
   a plurality of height position sensors each disposed to sense an adjustment position of a respective one of the height adjustment actuators and generate a height signal representative of that adjustment position; and
   a plurality of track-width position sensors, each disposed to sense an adjustment position of a respective one of the track-width adjustment actuators and generate a track width signal representative of that adjustment position;
   the method comprising:
      receiving a chassis-height adjustment command;
      monitoring the height signal for each of the plurality of height adjustment actuators;
      comparing a first height signal corresponding to one of the height adjustment actuators to height signals corresponding to the other height adjustment actuators;
      adjusting the one height adjustment actuator only if the first height signal is within a height tolerance range with respect to the height signals that correspond to the other height adjustment actuators; and
      adjusting the track-width adjustment actuators to shift the corresponding ground-engaging element a distance proportional to a change in the distance between the ground-engaging element attachment point and the chassis attachment point.

2. The method of claim 1, wherein the height signal of each adjustment actuator is compared to the height signals corresponding to the other height adjustment actuators, and wherein each height adjustment actuator is only adjusted if the height signal corresponding to that height adjustment actuator is within a height tolerance range with respect to the height signals that correspond to the other height adjustment actuators.

3. The method of claim 1, wherein the height tolerance range is predetermined.

4. The method of claim 1, wherein the chassis-height adjustment command comprises a target chassis-height position, and wherein the method further comprises comparing the target chassis height position to the height signals corresponding to each of the height adjustment actuators.

5. The method of claim 1, wherein the height adjustment actuators are hydraulic cylinders and are each connected to a common fluid source via a respective height adjustment control valve, wherein the method further comprises:
   simultaneously opening all of the height adjustment control valves that correspond to a height signal that is within the height tolerance range, and maintaining in a closed position or closing or restricting the height adjustment control valves that correspond to a height signal that is outside the height tolerance range.

6. The method of claim 1, further comprising:
   monitoring the track width signal for each of the plurality of track-width adjustment actuators;
   adjusting the one height adjustment actuator only if the track width signals are within a track width tolerance range relative to a target track width.

7. The method of claim 6, wherein the height adjustment actuators are hydraulic cylinders and are each connected to a common fluid source via a respective height adjustment control valve, wherein the track-width adjustment actuators are hydraulic cylinders and are each connected to the common fluid source via a respective track-width adjustment control valve, wherein the method further comprises:
   causing the track-width adjustment valves to be in an open position;
   causing the height adjustment control valves that correspond to a height signal that is within the height tolerance range to be in an open position; and
   causing the height adjustment control valves that correspond to a height signal that is outside the height tolerance range to be in a closed position.

8. A controller comprising a non-transitory computer-readable medium comprising computer-executable instructions that when executed via a processing unit cause a chassis-height adjustment system to perform the method of claim 1.

9. A chassis-height adjustment system for selectively raising and lowering a chassis relative to a ground surface, the system comprising:
   a chassis;
   a plurality of ground-engaging elements supporting the chassis above a ground surface;
   a plurality of track-width adjustment mechanisms mounted to the chassis, each track-width adjustment mechanism comprising a telescoping axle coupled with a respective one of the ground-engaging elements and a track-width adjustment actuator configured to move each axle between a retracted position and an extended position;
   a plurality of support assemblies supporting the chassis on the ground-engaging elements and each comprising a height adjustment actuator, wherein each support assembly defines a line of connection between a ground-engaging element attachment point and a chassis attachment point, each line of connection defining a non-zero angle θ corresponding to an angle of deviation from a direction of vertical travel of the chassis;
   a plurality of height position sensors each disposed to sense an adjustment position of a respective one of the height adjustment actuators and generate a height signal representative of that adjustment position;
a plurality of track-width position sensors, each disposed to sense an adjustment position of a respective one of the track-width adjustment actuators and generate a track width signal representative of that adjustment position; and
a controller configured to:
receive a chassis-height adjustment command;
monitor the height signal for each of the plurality of height adjustment actuators;
compare a first height signal corresponding to one of the height adjustment actuators to height signals corresponding to the other height adjustment actuators;
adjust the one height adjustment actuator only if the first height signal is within a height tolerance range with respect to the height signals that correspond to the other height adjustment actuators; and
adjust the track-width adjustment actuators to shift the corresponding ground-engaging element a distance proportional to a change in the distance between the ground-engaging element attachment point and the chassis attachment point.

10. A chassis-height adjustment system for selectively raising and lowering a chassis relative to a ground surface, the system comprising:
a chassis;
a plurality of ground-engaging elements supporting the chassis above a ground surface;
a plurality of support assemblies supporting the chassis on the ground-engaging elements and each comprising a height adjustment actuator;
a plurality of height position sensors each disposed to sense an adjustment position of a respective one of the height adjustment actuators and generate a height signal that is representative of that adjustment position;
a track-width adjustment system for shifting the position of at least one of the ground-engaging elements laterally relative to the chassis, the track-width adjustment system comprising a plurality of track-width adjustment actuators, each corresponding to one of the plurality of ground-engaging elements; and
a controller configured to:
receive a chassis-height adjustment command;
monitor the height signal for each of the plurality of height adjustment actuators;
compare a first height signal corresponding to one of the height adjustment actuators to height signals corresponding to the other height adjustment actuators; and
simultaneously actuate the chassis-height adjustment system and the track-width adjustment system to preserve a constant track width as the chassis moves up or down relative to the ground surface.

11. A method of controlling a chassis-height adjustment system for selectively raising and lowering a chassis relative to a ground surface, the system comprising:
a chassis;
a plurality of ground-engaging elements supporting the chassis above a ground surface;
a plurality of support assemblies supporting the chassis on the ground-engaging elements and each comprising a height adjustment actuator, each of the plurality of support assemblies being mounted to the chassis by a respective track-width adjustment mechanism having a track-width adjustment actuator configured to shift the position of the associated ground-engaging element laterally relative to the chassis;
a plurality of height position sensors each disposed to sense an adjustment position of a respective one of the height adjustment actuators and generate a height signal that is representative of that adjustment position; and
a plurality of track-width position sensors each disposed to sense an adjustment position of a respective one of the track-width adjustment actuators and generate a track width signal that is representative of that adjustment position;
the method comprising:
receiving a chassis-height adjustment command;
monitoring the height signal for each of the plurality of height adjustment actuators and the track width signals for each of the track-width adjustment actuators; and
adjusting the height adjustment actuators only if the track width signals are within a track width tolerance range with respect to a target track width.

12. A vehicle comprising:
a chassis;
a plurality of ground-engaging elements supporting the chassis above a ground surface;
a motor for driving at least one of the ground-engaging elements to thereby propel the machine along the ground surface;
a chassis-height adjustment system for selectively raising and lowering the chassis relative to the ground surface and comprising a plurality of height adjustment actuators each corresponding to one of the plurality of ground-engaging elements;
a track-width adjustment system for shifting the position of at least one of the ground-engaging elements laterally relative to the chassis and comprising a plurality of track-width adjustment actuators each corresponding to one of the plurality of ground-engaging elements; and
a controller configured to:
automatically actuate the track-width adjustment system when the chassis-height adjustment system is actuated to preserve a constant track width as the chassis moves up or down relative to the ground surface, and to stop movement of one or more of the height adjustment actuators in response to a sensed position of the one or more height adjustment actuators being outside of a height tolerance with respect to sensed positions of the other height adjustment actuators or a sensed position of the one or more track-width adjustment actuators being outside of a track width tolerance with respect to a target track width; and
simultaneously actuate the chassis-height adjustment system and the track-width adjustment system to preserve the constant track width as the chassis moves up or down relative to the ground surface.

13. The vehicle of claim 12, wherein the height adjustment actuators and the track-width adjustment actuators are hydraulic cylinders that are each connected to a common fluid source via a respective control valve.

14. The vehicle of claim 12, the vehicle being an agricultural sprayer including a liquid holding tank and a delivery system for applying contents of the holding tank.

15. The vehicle of claim 12, further comprising a user interface for allowing a user to actuate the chassis-height adjustment system, the controller configured to automatically actuate the track-width adjustment system as the user actuates the chassis-height adjustment system to preserve the constant track width as the chassis moves up or down relative to the ground surface.

* * * * *